US012792401B2

(12) United States Patent
Griffin et al.

(10) Patent No.: US 12,792,401 B2
(45) Date of Patent: Nov. 10, 2026

(54) ORCHESTRATION OF QUANTUM SYSTEMS USING QUANTUM ISOLATION ZONES

(71) Applicant: Red Hat, Inc., Raleigh, NC (US)

(72) Inventors: Leigh Griffin, Waterford (IE); Stephen Coady, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 1095 days.

(21) Appl. No.: 17/586,195

(22) Filed: Jan. 27, 2022

(65) Prior Publication Data

US 2023/0251904 A1 Aug. 10, 2023

(51) Int. Cl.
*G06F 9/50* (2006.01)
*G06N 10/20* (2022.01)

(52) U.S. Cl.
CPC ........... *G06F 9/5022* (2013.01); *G06N 10/20* (2022.01)

(58) Field of Classification Search
None
See application file for complete search history.

(56) References Cited

U.S. PATENT DOCUMENTS 6,243,455 B1 * 6/2001 Tuunanen ............ H04Q 3/0054 379/207.02
6,515,983 B1 * 2/2003 Utas ...................... H04W 76/00 370/352
10,956,830 B1 3/2021 Rigetti et al.
2010/0257611 A1 * 10/2010 Van Den Heuvel .... H04L 63/10 726/26
2010/0325638 A1 * 12/2010 Nishimaki .............. G06F 9/505 718/104
2018/0260245 A1 9/2018 Smith
2019/0394669 A1 * 12/2019 Han ....................... H04W 80/08
2020/0201655 A1 * 6/2020 Griffin .................. G06F 9/4494
2021/0019161 A1 * 1/2021 Hadas ................. G06F 9/45558
2021/0175976 A1 * 6/2021 Rahman ................ H04L 9/0855
2022/0398099 A1 * 12/2022 Willenborg ............ G06N 10/00
2023/0109690 A1 * 4/2023 Mutha ................... G06F 9/5083 718/1

(Continued)

FOREIGN PATENT DOCUMENTS

CN 110083454 A 8/2019
CN 111868676 A 10/2020
EP 3376361 B1 2/2021

OTHER PUBLICATIONS

Leymann, F. et al., "Hybrid Quantum Applications Need Two Orchestrations in Superposition: A Software Architecture Perspective," Mar. 7, 2021, https://arxiv.org/abs/2103.04320, 15 pages.

(Continued)

*Primary Examiner* — Zujia Xu
(74) *Attorney, Agent, or Firm* — Dority & Manning, P.A.

(57) ABSTRACT

Quantum isolation zone (QIZ) metadata is obtained for each of a plurality of different quantum isolation zones (QIZs) implemented on a quantum computing system. Each respective QIZ has a plurality of qubits associated therewith that is inaccessible to quantum processes not associated with the respective QIZ. It is determined, based on the QIZ metadata for a first QIZ of the quantum computing system, that a resource associated with the first QIZ should be deallocated. A deallocation of the resource associated with the first QIZ is caused.

20 Claims, 26 Drawing Sheets

| | QID | SAS | QIZID | QIZAS | PROC | PAR | CHLD | MD |
|---|---|---|---|---|---|---|---|---|
| 28-1 | Q1 | NA | Z1 | NA | PA | NULL | NULL | XXX |
| 28-2 | Q2 | NA | Z1 | NA | PA | NULL | NULL | XXX |
| 28-3 | Q3 | NA | Z1 | A | NULL | NULL | NULL | XXX |
| 28-4 | Q4 | NA | Z1 | A | NULL | NULL | NULL | XXX |
| 28-5 | Q5 | NA | Z2 | NA | PB | NULL | NULL | XXX |
| 28-6 | Q6 | NA | Z2 | A | NULL | NULL | NULL | XXX |
| 28-7 | Q7 | NA | Z2 | A | NULL | NULL | NULL | XXX |
| 28-8 | Q8 | NA | Z2 | A | NULL | NULL | NULL | XXX |

(56) References Cited

U.S. PATENT DOCUMENTS

| | | | | |
|---|---|---|---|---|
| 2023/0112525 A1* | 4/2023 | Naveh | G06N 10/00 | 716/100 |
| 2023/0141379 A1* | 5/2023 | Ding | G06N 10/20 | 708/209 |
| 2023/0188548 A1* | 6/2023 | Bhaskar | G06N 10/80 | 726/22 |
| 2024/0061724 A1* | 2/2024 | Zhao | G06N 10/00 | |
| 2024/0134711 A1* | 4/2024 | Fang | G06N 10/00 | |

OTHER PUBLICATIONS

Liu, Y. et al., "A Novel Approach for Service Function Chain Dynamic Orchestration in Edge Clouds," IEEE Communications Letters, vol. 24, Issue 10, Jun. 8, 2020, IEEE, 5 pages.

Wild, K. et al., "TOSCA4QC: Two Modeling Styles for TOSCA to Automate the Deployment and Orchestration of Quantum Applications," 2020 IEEE 24th International Enterprise Distributed Object Computing Conference (EDOC), Oct. 2020, IEEE Computer Society, 11 pages.

* cited by examiner

| | QID 29 | SAS 30 | QIZID 32 | QIZAS 34 | PROC 36 | PAR 38 | CHLD 40 | MD 42 |
|---|---|---|---|---|---|---|---|---|
| 28-1 | Q1 | NA | Z1 | NA | PA | NULL | PC,PD | XXX |
| 28-2 | Q2 | NA | Z1 | NA | PA | NULL | PC,PD | XXX |
| 28-3 | Q3 | NA | Z1 | NA | PB | NULL | NULL | XXX |
| 28-4 | Q4 | NA | Z1 | NA | PC | PA | NULL | XXX |
| 28-5 | Q5 | NA | Z1 | NA | PD | PA | NULL | XXX |
| 28-6 | Q6 | NA | Z1 | A | NULL | NULL | NULL | XXX |
| 28-7 | Q7 | A | NULL | NULL | NULL | NULL | NULL | XXX |
| 28-8 | Q8 | A | NULL | NULL | NULL | NULL | NULL | XXX |
| 28-9 | Q9 | A | NULL | NULL | NULL | NULL | NULL | XXX |
| 28-10 | Q10 | A | NULL | NULL | NULL | NULL | NULL | XXX |
| 28-11 | Q11 | A | NULL | NULL | NULL | NULL | NULL | XXX |
| 28-12 | Q12 | A | NULL | NULL | NULL | NULL | NULL | XXX |

ORCHESTRATION OF QUANTUM SYSTEMS USING QUANTUM ISOLATION ZONES

BACKGROUND

Quantum computing utilizes qubits to perform quantum calculations. Qubits are finite resources. As quantum computing continues to increase in popularity and become more commonplace, an ability to programmatically coordinate access to qubits will be desirable.

SUMMARY

The examples disclosed herein implement a quantum isolation zone (QIZ) orchestrator that operates to ensure QIZs utilize resources efficiently.

In one example a method is provided. The method includes obtaining, by a computing device comprising a processor device, quantum isolation zone (QIZ) metadata for each of a plurality of different quantum isolation zones (QIZs) implemented on a first quantum computing system, each respective QIZ having a plurality of qubits associated therewith that is inaccessible to quantum processes not associated with the respective QIZ. The method further includes determining, based on the QIZ metadata for a first QIZ of the first quantum computing system, that a resource associated with the first QIZ should be deallocated. The method further includes causing a deallocation of the resource associated with the first QIZ.

In another example a computing system is provided. The computing system includes a memory, and a processor device coupled to the memory to obtain quantum isolation zone (QIZ) metadata for each of a plurality of different quantum isolation zones (QIZs) implemented on a first quantum computing system, each respective QIZ having a plurality of qubits associated therewith that is inaccessible to quantum processes not associated with the respective QIZ. The processor device is further to determine, based on the QIZ metadata for a first QIZ of the first quantum computing system, that a resource associated with the first QIZ should be deallocated. The processor device is further to cause a deallocation of the resource associated with the first QIZ.

In another example a non-transitory computer-readable storage medium is provided. The non-transitory computer-readable storage medium includes executable instructions to cause a processor device on a quantum computing system to obtain quantum isolation zone (QIZ) metadata for each of a plurality of different quantum isolation zones (QIZs) implemented on a first quantum computing system, each respective QIZ having a plurality of qubits associated therewith that is inaccessible to quantum processes not associated with the respective QIZ. The instructions further cause the processor device to determine, based on the QIZ metadata for a first QIZ of the first quantum computing system, that a resource associated with the first QIZ should be deallocated. The instructions further cause the processor device to cause a deallocation of the resource associated with the first QIZ.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
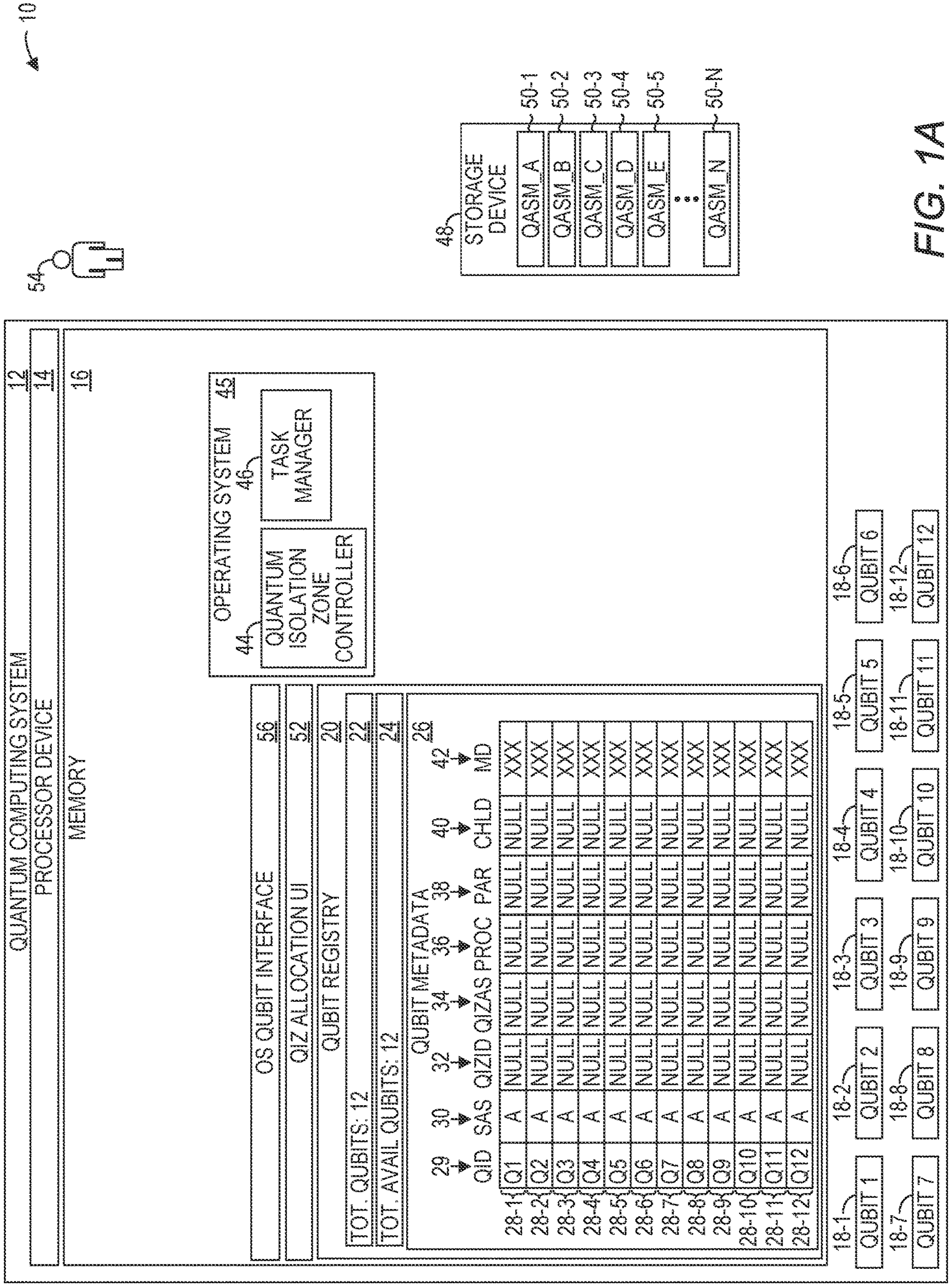
FIGS. 1A-1F are block diagrams of an environment, at successive points in time, in which quantum isolation zones (QIZs) can be practiced according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as “first message” and “second message,” and does not imply a priority, a type, an importance, or other attribute, unless otherwise stated herein. The term “about” used herein in conjunction with a numeric value means any value that is within a range of ten percent greater than or ten percent less than the numeric value. As used herein and in the claims, the articles “a” and “an” in reference to an element refers to “one or more” of the element unless otherwise explicitly specified. The word “or” as used herein and in the claims is inclusive unless contextually impossible. As an example, the recitation of A or B means A, or B, or both A and B.

Quantum computing utilizes qubits to perform quantum calculations. Qubits are finite resources, but as the technology evolves, quantum computing systems are implementing larger and larger numbers of qubits. As quantum computing continues to increase in popularity and become more commonplace, it is increasingly important for the operating system to control access to qubits to, for example, ensure that one quantum process does not inadvertently access a qubit utilized by another quantum process, ensure that qubits containing private information can only be accessed by quantum processes that should have access to such private information, and to generally isolate one quantum process from another quantum process.

The examples disclosed herein implement quantum isolation zones (QIZs) that ensure a quantum process can only access qubits allocated to the QIZ in which the quantum process executes, and has no visibility to or ability to access qubits allocated to other QIZs or that are otherwise implemented on the quantum computing system. The examples also implement quantum process relationship graphs that facilitate visibility of qubits by a plurality of quantum processes that execute within a QIZ and that have relationships with one another. A first quantum process executing in a QIZ that is not related to a second quantum process executing in the same QIZ has no visibility to the qubits allocated to the second quantum process. Thus, the examples facilitate isolation even within the same QIZ, or qubit sharing within the same QIZ among related quantum processes.

Additional examples disclosed herein implement local services in QIZs. In particular, in response to a request, a criterion, or some other trigger, a local service instance of a global service provided on the quantum computing system may be initiated for a QIZ. The implementation of local services in a QIZ eliminates an otherwise single-threaded nature of a global service and thus implements scalability on the quantum computing system as the numbers of qubits and QIZs implemented by the quantum computing system increase in quantity.

In one example a QIZ controller may make a determination to initiate, for a QIZ, a local service instance of a global service instance that is executing on the quantum computing system. The QIZ controller may initiate the local service instance based on a request, a criterion, or some other trigger. The QIZ controller modifies a local service data structure to indicate that the local service is associated with the QIZ. Subsequent requests by quantum processes associated with the QIZ for services implemented by the global service are routed by the QIZ controller to the local service in a manner that is transparent to the service requestor, reducing the load on the global service and decreasing the amount of time it would otherwise take to respond to the request.

Other examples disclosed herein relate to a QIZ orchestrator that operates to ensure QIZs utilize resources efficiently, and facilitates interactions between QIZs. Because QIZs operate independently of each other, but utilize global resources, such as qubits, memory, and processor device cycles, a QIZ may inadvertently be allocated resources that, at some point in time, stop being utilized. Such unused resources may negatively impact other QIZs that may be able to utilize such resources, such as qubits, and/or memory or processor device cycles. The QIZ orchestrator obtains QIZ metadata for each of a plurality of QIZs implemented on a quantum computing system. The QIZ orchestrator may determine, based on the QIZ metadata for a QIZ, that a resource associated with the QIZ is unused or underutilized, and therefore should be deallocated. The QIZ orchestrator then causes the deallocation of the resource associated with the QIZ, thereby freeing up a resource for use by other QIZs.

FIGS. 1A-1F are block diagrams of an environment, at successive points in time, in which QIZs can be practiced according to one implementation. Referring first to FIG. 1A, an environment 10 includes a quantum computing system 12 that operates in a quantum environment but can operate using classical computing principles or quantum computing principles. When using quantum computing principles, the quantum computing system 12 performs computations that utilize quantum-mechanical phenomena, such as superposition and entanglement. The quantum computing system 12 may operate under certain environmental conditions, such as at or near 0° Kelvin. When using classical computing principles, the quantum computing system 12 utilizes binary digits that have a value of either 1 or 0.

The quantum computing system 12 includes at least one processor device 14 and at least one memory 16. The quantum computing system 12 implements twelve qubits 18-1-18-12 (generally, qubits 18). The quantum computing system 12 includes a qubit registry 20 that maintains information about the qubits 18-1-18-12, including, by way of non-limiting example, a total qubits counter 22 that identifies the total number of qubits 18 implemented by the quantum computing system 12 and a total available qubits counter 24 that maintains count of the total number of qubits 18 that are currently available for allocation.

The qubit registry 20 also maintains qubit metadata 26, which comprises a plurality of metadata records 28-1-28-12 (generally, metadata records 28), each of which maintains information about a corresponding qubit 18-1-18-12. Each metadata record 28 includes a qubit identifier (QID) 29 that contains an identifier of the qubit 18-1-18-12 to which the respective metadata record 28 corresponds, a system availability status (SAS) 30 that identifies whether the corresponding qubit 18 is available for allocation at the quantum computing system level, a QIZ identifier (QIZID) 32 that identifies the QIZ, if any, to which the corresponding qubit 18 has been allocated, and a QIZ availability status (QIZAS) 34 that identifies whether the corresponding qubit 18, if allocated to a QIZ, is available in the QIZ or has been allocated to a quantum process executing in the QIZ. Each metadata record 28 also includes a process identifier 36 of the quantum process, if any, to which the corresponding qubit 18 has been allocated, a parent identifier 38 that identifies a parent quantum process, if any, of the quantum process to which the corresponding qubit 18 has been assigned, and a child identifier 40 that identifies a child quantum process, if any, of the quantum process to which the corresponding qubit 18 has been assigned. Each metadata record 28 may also include additional metadata 42 not relevant to the examples disclosed herein, such as metadata indicating a real-time state of the corresponding qubit 18, such as whether the qubit 18 is in an entangled state, is in superposition, or the like. While solely for purposes of illustration the quantum computing system 12 is described as having only twelve qubits 18, it is apparent that the quantum computing system 12 may have hundreds or thousands of qubits 18 in some implementations.

At the point in time illustrated in FIG. 1A, the qubits 18 are unallocated, and thus, the system availability status 30 for each metadata record 28 has a value of "A" indicating that the corresponding qubit 18 is available. The values of the other fields in the metadata records 28 are "NULL", which can comprise any value that indicates that the field is empty.

The quantum computing system 12 includes a QIZ controller 44 that, as described in greater detail below, operates to establish QIZs in which quantum processes execute and have access to allocated qubits 18, but no access or only controlled access to qubits 18 allocated to other QIZs. The QIZ controller 44 may be an operating system component, such as a kernel module or the like, of an operating system 45. The QIZ controller 44 may run at a ring 0 level of the processor device 14 and thus execute in a kernel mode and a kernel space rather than as a user process in a user space. The quantum computing system 12 includes a task manager 46 that is configured to initiate a quantum process from a quantum program file, such as a quantum assembly language (QASM) file, or the like. In this example, a storage device 48 contains a plurality of QASM files 50-1-50-N, each of which includes quantum programming instructions that, when executed, implement a desired functionality.

The quantum computing system 12 may include a QIZ allocation user interface (UI) 52 that allows an operator 54 to interact with the QIZ controller 44 to establish a QIZ. The quantum computing system 12 may also include an operating system (OS) qubit interface 56 that is invoked when a quantum process attempts to read, write, or otherwise query a qubit 18. The OS qubit interface 56, in turn, communicates with the QIZ controller 44, or, in other implementations, the QIZ controller 44 may be integrated with the OS qubit interface 56.

Assume that the QIZ controller 44 receives a request from a requestor to allocate a first group of qubits 18 from available qubits 18 to establish a first QIZ that limits visibility of any quantum process associated with the first QIZ to only the qubits 18 in the first group of qubits 18. The request may identify the number of qubits 18 and, if applicable, other criteria, such as a particular type of qubit, or any other desired characteristics of the qubits 18.

In one example, the requestor may be the QIZ allocation UI 52 which makes the request in response to input from the operator 54. In another example, the request may be a programmatic request from a process executing on the quantum computing system 12 or elsewhere. In this example, the request indicated that six qubits 18 were to be allocated to the QIZ. The request may come directly to the QIZ controller 44, or indirectly via the OS qubit interface 56. The QIZ controller 44 accesses the qubit metadata 26 and identifies six qubits 18 that have a system availability status 30 that indicates the qubits 18 are available. In this example, the QIZ controller 44 determined that the six qubits 18-1-18-6 were available based on the system availability status 30 of the metadata records 28-1-28-6.

Figure 1B:
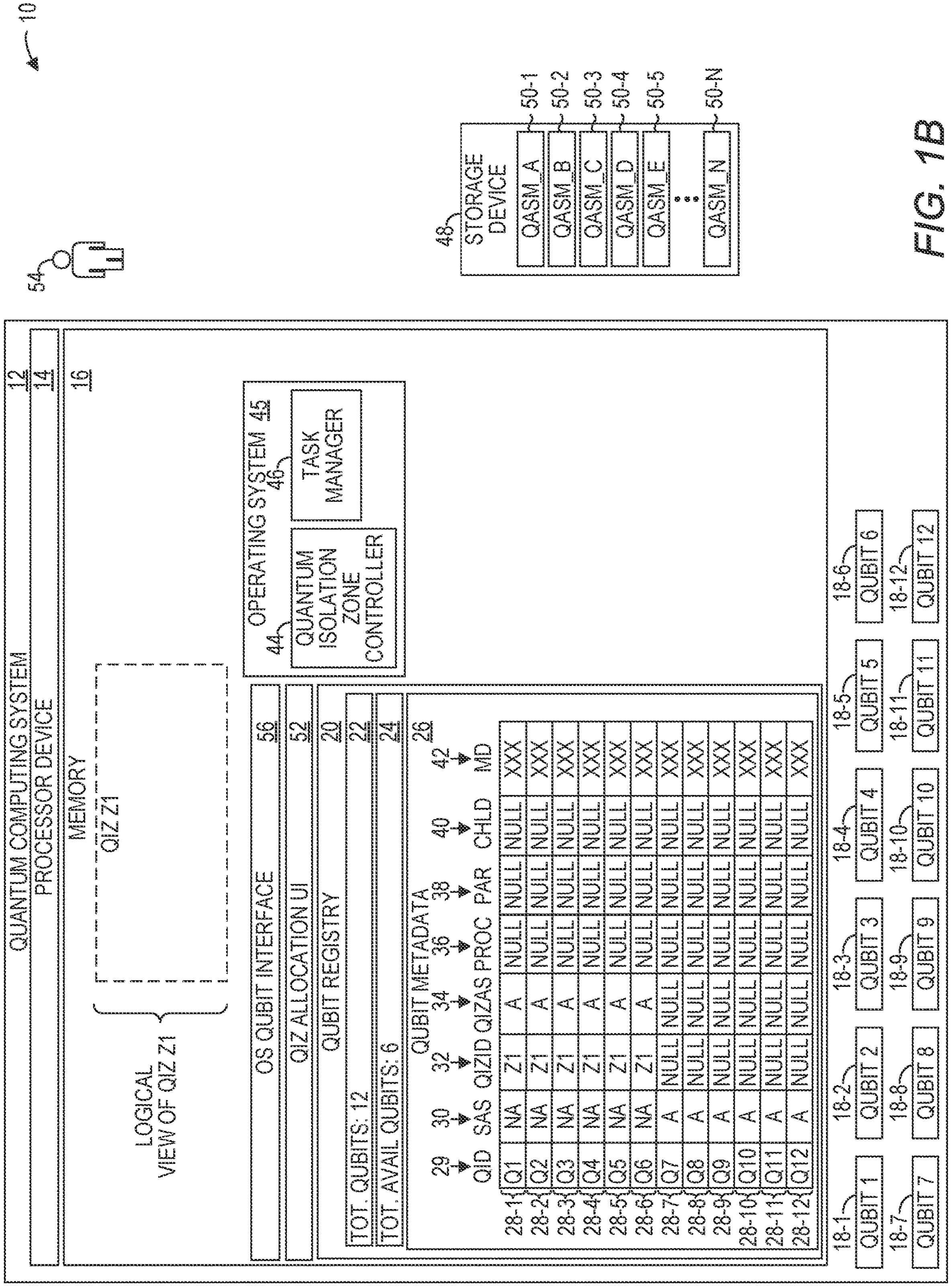

Referring now to FIG. 1B, the QIZ controller 44 modifies the system availability status 30 of the metadata records 28-1-28-6 with a value of "NA" (not available) to indicate that the six qubits 18-1-18-6 are no longer available for allocation. The QIZ controller 44 obtains a unique QIZ identifier, in this example, "Z1", and modifies the QIZ ID 32 to indicate that the qubits 18-1-18-6 have been allocated to the QIZ Z1. The QIZ controller 44 may generate the unique QIZ ID or be provided the unique QIZ ID by the requestor or some other mechanism. The QIZ controller 44 modifies the QIZ availability status 34 to indicate that the qubits 18-1-18-6 are available for allocation within the QIZ Z1. The QIZ controller 44 modifies the total available qubits counter 24 to indicate that six qubits 18 (i.e., qubits 18-7-18-12) are now available for allocation to a QIZ.

For purposes of illustration, a logical QIZ Z1 is illustrated in dashed lines in the Figures to facilitate an understanding of the isolation and relationship aspects of QIZs implemented by the examples herein. However, it should be understood that the QIZ Z1 illustrated in the Figures in dashed outline is a logical depiction only provided for ease of understanding and that the functionality of the QIZ Z1 is implemented via the QIZ controller 44, the qubit metadata 26, and other components as described herein.

Assume that the task manager 46 receives a request to initiate a quantum process based on the QASM file 50-1 into the QIZ Z1. The request may be contained in a schedule, may be received programmatically, or may be initiated via input from the operator 54. The task manager 46 may access the QASM file 50-1 and parse the QASM file 50-1 to determine that, during execution, a quantum process initiated from the QASM file 50-1 will utilize two qubits 18. In other implementations, the number of qubits 18 to be allocated to the quantum process may be contained in the request to initiate the quantum process. The task manager 46 sends a request to the QIZ controller 44 for an allocation of two qubits 18 from the QIZ Z1. The QIZ controller 44 receives the request to allocate two qubits 18 in the QIZ Z1 to a quantum process that is, or will be, associated with the QIZ Z1. Based on the metadata records 28, the QIZ controller 44 determines that the qubits 18-1 and 18-2 are available for allocation within the QIZ Z1.

Figure 1C:
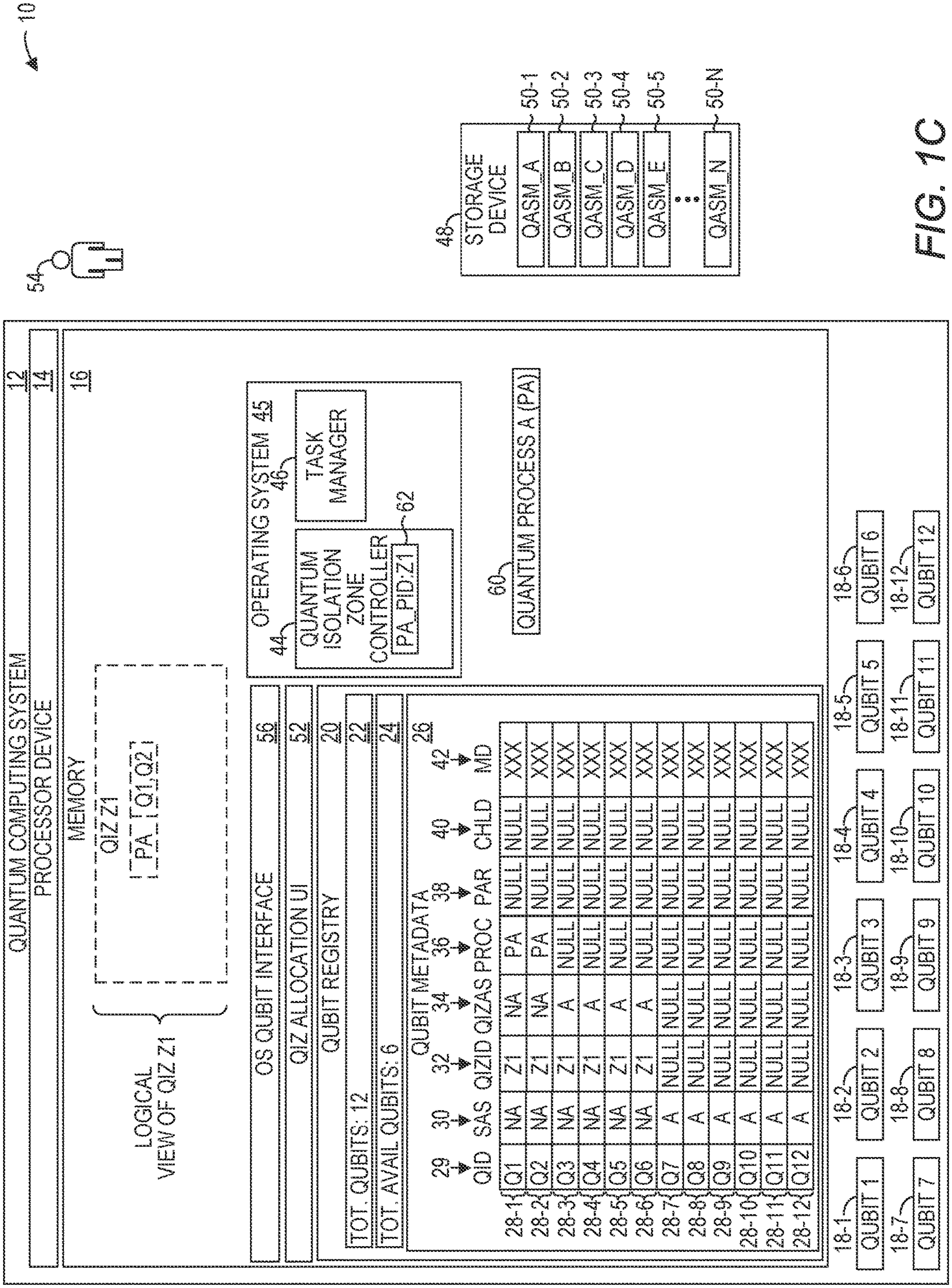

Referring now to FIG. 1C, the QIZ controller 44 modifies the QIZ availability status 34 of the metadata records 28-1 and 28-2 to indicate that the corresponding qubits 18-1 and 18-2 have been allocated and thus are no longer available for allocation (e.g., "NA"). The QIZ controller 44 provides the qubit IDs of the qubits 18-1 and 18-2 to the task manager 46. The task manager 46 initiates a quantum process 60 ("PA") into the QIZ Z1 with location/address information of the qubits 18-1 and 18-2. The task manager 46 provides a unique program ID (PID) of the quantum process 60 ("PA_PID") to the QIZ controller 44. The QIZ controller 44 maintains a mapping record 62 that maps the PID to the QIZ Z1. The quantum process 60 is now said to "execute in" or be "associated with" the QIZ Z1, because the visibility of and access to the qubits 18-1-18-12 is now constrained by the QIZ Z1.

As an example, assume that, at the point in time illustrated in FIG. 1C, the quantum process 60 issues a request to the OS qubit interface 56 to obtain a list of qubit IDs of all qubits 18 to which the quantum process 60 has access (i.e., read access and/or write access) or which are available for allocation. The OS qubit interface 56 communicates with the QIZ controller 44. The QIZ controller 44 determines the PID of the requestor, in this case the PID PA_PID, which is the PID of the quantum process 60. The QIZ controller 44 accesses the mapping record 62 and determines that the quantum process 60 is associated with the QIZ Z1. The QIZ controller 44 accesses the metadata records 28 and determines that the qubits 18-1-18-6 have been allocated to the QIZ Z1, and that the four qubits 18-3-18-6 are available. Because the qubits 18-1 and 18-2 have already been allocated to the quantum process 60, and the four qubits 18-3-18-6 are available, the QIZ controller 44 returns the qubit IDs of the qubits 18-1-18-6 to the quantum process 60 via the OS qubit interface 56, indicating that the quantum process 60 has access to the qubits 18-1 and 18-2 and that the qubits 18-3-18-6 are available for allocation. Thus, from the perspective of the quantum process 60, the quantum computing system 12 contains four available qubits 18, and the quantum process 60 is unaware of and unable to access (e.g., is isolated from) the actual additional available qubits 18-7-18-12.

Assume that, in response to the information that the qubits 18-3-18-6 are available, the quantum process 60 issues a request to the OS qubit interface 56 to have an additional qubit 18 allocated to the quantum process 60. The OS qubit interface 56 provides the request to the QIZ controller 44. The QIZ controller 44 then selects one of the qubits 18-3-18-6, modifies the appropriate metadata record 28 to indicate the qubit 18 is now allocated to the quantum process 60, and returns information to the quantum process 60 identifying the allocated qubit 18. Note that this is merely an example of a potential action that the quantum process 60 may take, and is thus not reflected in the metadata records 28 illustrated in FIG. 1C.

Figure 1D:
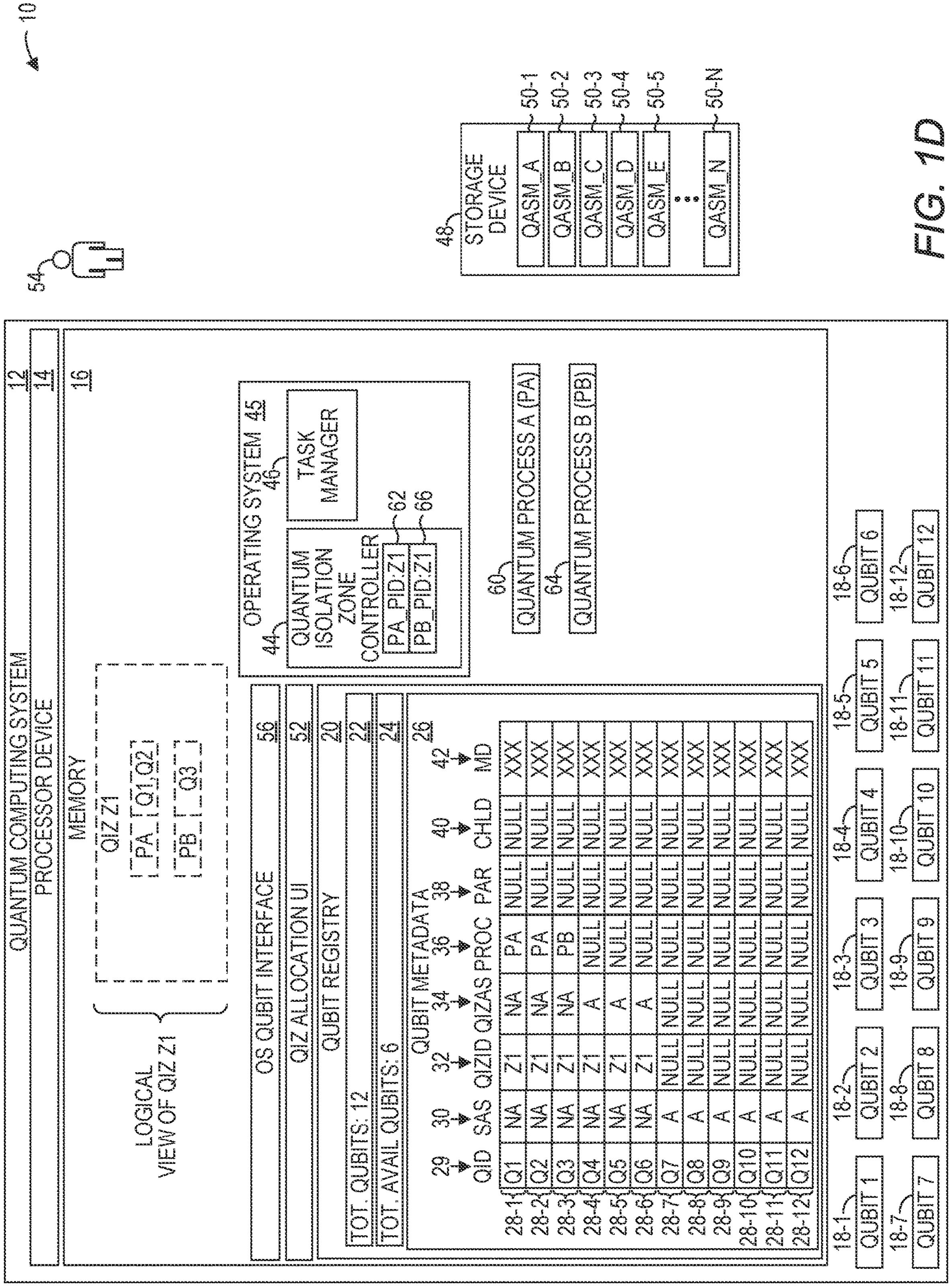

Assume that the task manager 46 receives a request to initiate a quantum process based on the QASM file 50-2 into the QIZ Z1. The task manager 46 may access the QASM file 50-2 and parse the QASM file 50-2 to determine that, during execution, the quantum process will utilize one qubit 18. The task manager 46 sends a request to the QIZ controller 44 for an allocation of one qubit 18 from the QIZ Z1. The QIZ controller 44 receives the request to allocate one qubit in the QIZ Z1 to a quantum process that is, or will be, associated with the QIZ Z1. Based on the metadata records 28, the QIZ controller 44 determines that the qubit 18-3 is available for allocation within the QIZ Z1. Referring now to FIG. 1D, the QIZ controller 44 modifies the QIZ availability status 34 of the metadata record 28-3 to indicate that the corresponding qubit 18-3 has been allocated and thus is no longer available for allocation (e.g., "NA").

The QIZ controller 44 provides the qubit ID of the qubit 18-3 to the task manager 46. The task manager 46 initiates a quantum process 64 ("PB") into the QIZ Z1 with location information of the qubit 18-3. The task manager 46 provides a unique PID of the quantum process 64 ("PB_PID") to the QIZ controller 44. The QIZ controller 44 maintains a mapping record 66 that maps the PID to the QIZ Z1. The quantum process 64 is now said to "execute in" or be "associated with" the QIZ Z1.

Assume that, at the point in time illustrated in FIG. 1D, subsequent to the allocation of the qubit 18-3 to the quantum process 64, the quantum process 60 issues a request to the OS qubit interface 56 to obtain a list of qubit IDs of all qubits 18 to which the quantum process 60 has access (i.e., read access and/or write access) and which are available for allocation. The OS qubit interface 56 communicates with the QIZ controller 44. The QIZ controller 44 determines the PID of the requestor, in this case the PID PA_PID, which is the PID of the quantum process 60. The QIZ controller 44 accesses the mapping record 62 and determines that the quantum process 60 is associated with the QIZ Z1. The QIZ controller 44 accesses the metadata records 28 and determines that the qubits 18-1-18-6 have been allocated to the QIZ Z1, the qubit 18-3 has been allocated to the quantum process 64, and that the three qubits 18-4-18-6 are available. Based on the metadata record 28-3, the QIZ controller 44 determines that the quantum process 64 is not related to the quantum process 60 because the parent identifier 38 and the child identifier 40 are NULL, indicating that the quantum process 60 has no parent process or child process at this time. Because the quantum process 60 and the quantum process 64 are unrelated, the quantum process 64 has no visibility to or access to qubits 18 allocated to the quantum process 60, and the quantum process 60 has no visibility to or access to qubits 18 allocated to the quantum process 64.

Because the qubit 18-3 has been allocated to the quantum process 64, and the three qubits 18-4-18-6 are available, the QIZ controller 44 returns the qubit IDs of the qubits 18-1, 18-2, 18-4-18-6 to the quantum process 60 via the OS qubit interface 56, indicating that the quantum process 60 has access to the qubits 18-1 and 18-2, and that the qubits 18-4-18-6 are available for allocation. The quantum process 60 is thus unaware of the qubit 18-3 or the qubits 18-7-18-12.

Figure 1E:
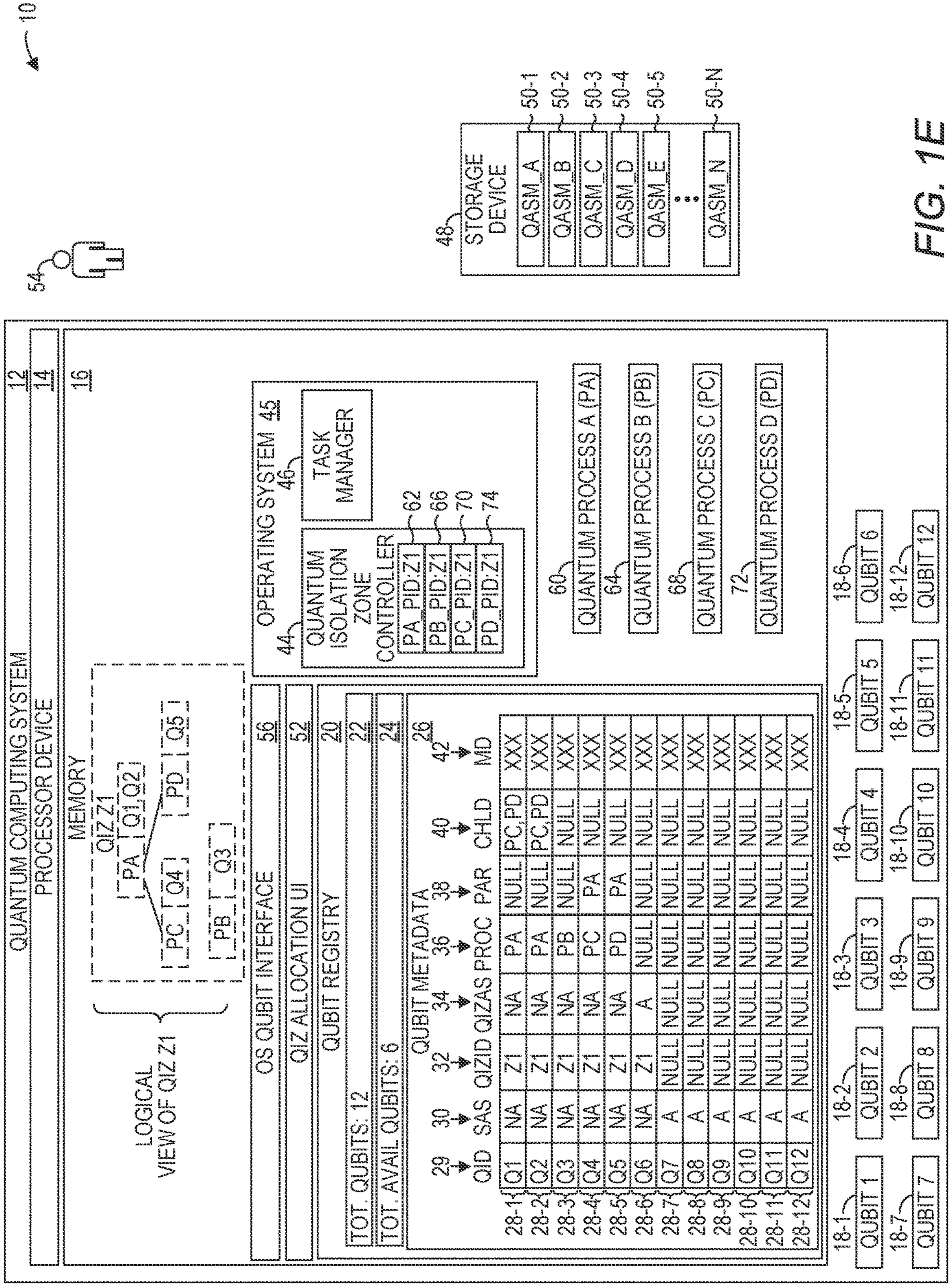

Referring now to FIG. 1E, a QIZ relationship graph that establishes relationships among quantum processes in a QIZ will be discussed. Assume that, in a manner similar to that discussed above with regard to the quantum processes 60 and 64, a quantum process 68 ("PC") is initiated from the QASM file 50-3 into the QIZ Z1 and allocated the qubit 18-4. The QIZ controller 44 generates a mapping record 70 that maps the PID of the quantum process 68 ("PC_PID") to the QIZ Z1. However, in this example, the quantum process 68 is identified as a child process of the quantum process 60. The designation may occur in any of several different manners. In one implementation, the task manager 46 may communicate to the QIZ controller 44 that the quantum process 68 is to be designated a child process of the quantum process 60. In another example, the request to initiate the quantum process 68 from the QASM file 50-3, and to allocate a qubit 18 to the quantum process 68, may originate from the quantum process 60. In this example, the act of the quantum process 60 requesting the initiation of the quantum process 68 by itself identifies the parent-child relationship.

The QIZ controller 44 modifies the QIZ availability status 34 of the metadata record 28-4 to indicate that the qubit 18-4 is no longer available for allocation. The QIZ controller 44 modifies the process identifier 36 of the metadata record 28-4 to indicate that the qubit 18-4 is allocated to the quantum process 68. The QIZ controller 44 modifies the parent identifier 38 of the metadata record 28-4 to indicate that the quantum process 60 is a parent process of the quantum process 68. The QIZ controller 44 modifies the child identifier 40 of the metadata records 28-1 and 28-2 to indicate that the quantum process 68 is a child process of the quantum process 60.

Assume further that a quantum process 72 ("PD") is initiated from the QASM file 50-4 into the QIZ Z1 and allocated the qubit 18-5. The QIZ controller 44 generates a mapping record 74 that maps the PID of the quantum process 72, PD_PID, to the QIZ Z1. In this example, the quantum process 72 is also identified as a child process of the quantum process 60.

The QIZ controller 44 modifies the QIZ availability status 34 of the metadata record 28-5 to indicate that the qubit 18-5 is no longer available for allocation. The QIZ controller 44 modifies the process identifier 36 of the metadata record 28-5 to indicate that the qubit 18-5 is allocated to the quantum process 72. The QIZ controller 44 modifies the parent identifier 38 of the metadata record 28-5 to indicate that the quantum process 60 is a parent process of the quantum process 72. The QIZ controller 44 modifies the child identifier 40 of the metadata records 28-1 and 28-2 to indicate that the quantum process 72 is a child process of the quantum process 60.

The metadata records 28-1, 28-2, 28-4 and 28-5 establish a relationship graph that appears, logically, as that illustrated in the logical view of the QIZ Z1 in FIG. 1E, such that the quantum process 60 is the parent process of the child quantum processes 68 and 72. As will be discussed herein, the relationship graph established in the metadata records

28-1, 28-2, 28-4, and 28-5 impacts the visibility of qubits 18 by the quantum processes 60, 64, 68, and 72.

To illustrate the impact of the relationship graph in the QIZ Z1, assume that the quantum process 60 issues a request to the OS qubit interface 56 to obtain a list of qubit IDs of all qubits 18 to which the quantum process 60 has access (i.e., read access and/or write access) or which are available for allocation. The OS qubit interface 56 communicates with the QIZ controller 44. The QIZ controller 44 determines the PID of the requestor, in this case the PID PA_PID, which is the PID of the quantum process 60. The QIZ controller 44 accesses the mapping record 62 and determines that the quantum process 60 is associated with the QIZ Z1. The QIZ controller 44 accesses the metadata records 28 and determines that the qubits 18-1-18-6 have been allocated to the QIZ Z1, and that the qubit 18-6 is available. The QIZ controller 44 also determines that the qubits 18-1 and 18-2 have been allocated to the quantum process 60. The QIZ controller 44 determines that the quantum process 60 has two child processes executing in the QIZ Z1, the quantum processes 68 and 72. Because the quantum processes 68 and 72 are child processes of the quantum process 60, the quantum process 60 has access to the qubits 18-4 and 18-5 allocated to the quantum processes 68 and 72, respectively. The QIZ controller 44 returns the qubit IDs of the qubits 18-1, 18-2, and 18-4-18-6, indicating that the quantum process 60 has access to the qubits 18-1, 18-2, 18-4, and 18-5, and that the qubit 18-6 is available for allocation.

Assume next that the quantum process 68 issues a request to the OS qubit interface 56 to obtain a list of qubit IDs of all qubits 18 to which the quantum process 68 has access (i.e., read access and/or write access) or which are available for allocation. The OS qubit interface 56 communicates with the QIZ controller 44. The QIZ controller 44 determines the PID of the requestor, in this case the PID PC_PID, which is the PID of the quantum process 68. The QIZ controller 44 accesses the mapping record 70 and determines that the quantum process 68 is associated with the QIZ Z1. The QIZ controller 44 accesses the metadata records 28 and determines that the qubits 18-1-18-6 have been allocated to the QIZ Z1, and that the qubit 18-6 is available. The QIZ controller 44 also determines that the qubit 18-4 has been allocated to the quantum process 68. The QIZ controller 44 determines that the quantum process 68 has no child processes executing in the QIZ Z1, and that the quantum process 60 is a parent process of the quantum process 68. Because the quantum process 60 is a parent process of the quantum process 68, the quantum process 68 has access to the qubits 18-1 and 18-2 allocated to the quantum process 60. However, because the quantum process 72 is neither a parent process nor a child process of the quantum process 68, the quantum process 68 has no visibility to the qubit 18-5 allocated to the quantum process 72. The QIZ controller 44 returns the qubit IDs of the qubits 18-1, 18-2, 18-4 and 18-6, indicating that the quantum process 68 has access to the qubits 18-1, 18-2, and 18-4, and that the qubit 18-6 is available for allocation.

Figure 1F:
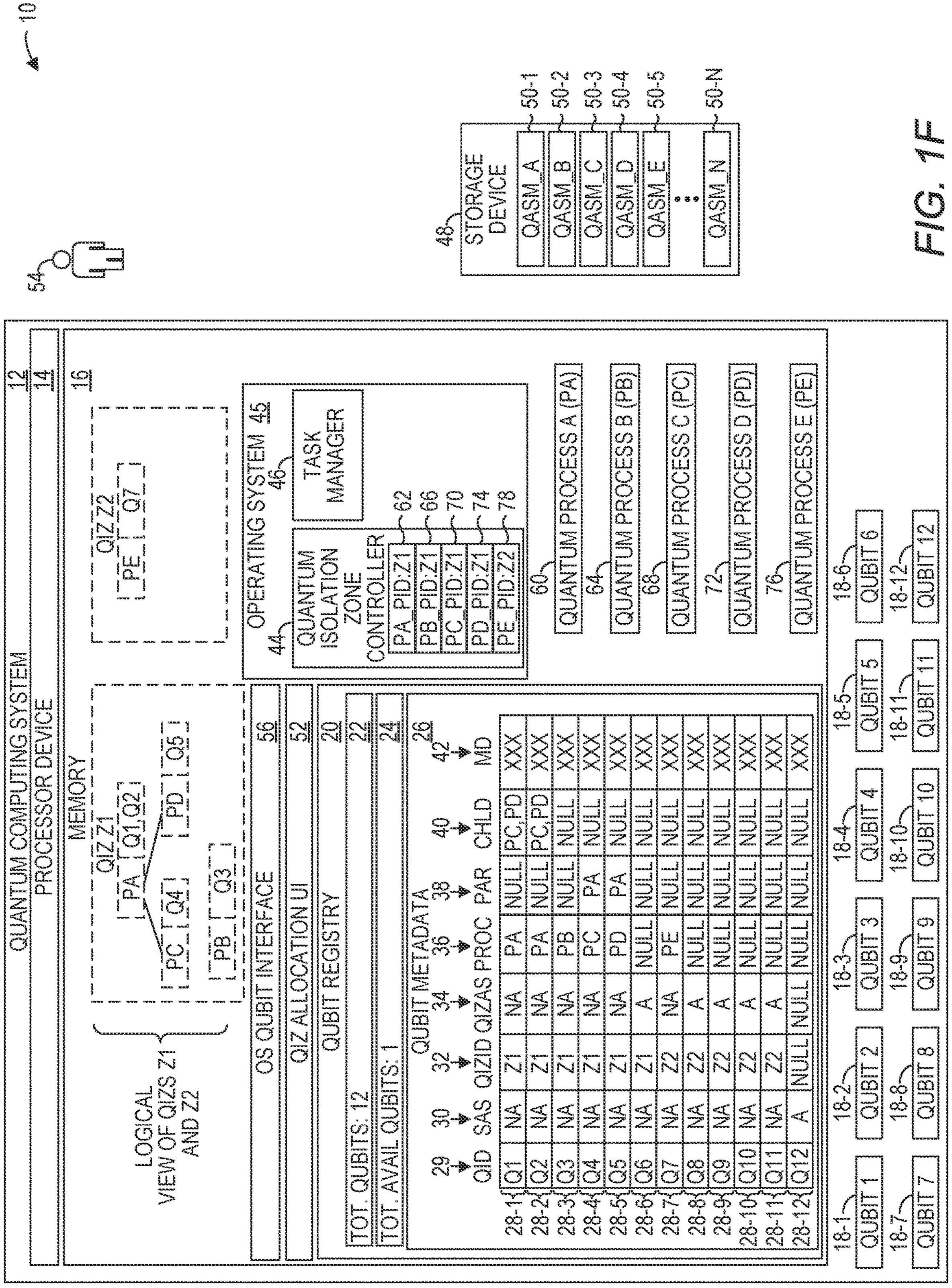

The QIZ controller 44 receives a request, from a requestor, to allocate a second group of qubits 18 from available qubits 18 to establish a second QIZ that limits visibility of any quantum process associated with the second QIZ to only the qubits 18 in the second group of qubits 18. In this example, the request indicates that five qubits 18 are to be allocated to the second QIZ. The QIZ controller 44 accesses the qubit metadata 26 and identifies five qubits 18 that have a system availability status 30 that indicates the qubits 18 are available. In this example, the QIZ controller 44 determines that the five qubits 18-7-18-11 are available based on the system availability status 30 of the metadata records 28-7-28-11. Referring now to FIG. 1F, the QIZ controller 44 modifies the system availability status 30 of the metadata records 28-7-28-11 to indicate that the five qubits 18-7-18-11 are no longer available for allocation. The QIZ controller 44 obtains a unique QIZ identifier, in this example, "Z2", and modifies the QIZ ID 32 of the metadata records 28-7-28-11 to indicate that the qubits 18-7-18-11 have been allocated to the QIZ Z2. The QIZ controller 44 modifies the QIZ availability status 34 of the metadata records 28-7-28-11 to indicate that the qubits 18-7-18-11 are available for allocation within the QIZ Z2. The QIZ controller 44 modifies the total available qubits counter 24 to indicate that one qubit 18 (i.e., qubit 18-12) is now available for allocation to a QIZ.

Assume further that the task manager 46 receives a request to initiate a quantum process based on the QASM file 50-5 into the QIZ Z2. The task manager 46 may access the QASM file 50-5 and parse the QASM file 50-5 to determine that, during execution, the quantum process initiated from the QASM file 50-5 will utilize one qubit 18. The task manager 46 sends a request to the QIZ controller 44 for an allocation of one qubit 18 from the QIZ Z2. The QIZ controller 44 receives the request to allocate one qubit in the QIZ Z2 to a quantum process that is, or will be, associated with the QIZ Z2. Based on the metadata records 28, the QIZ controller 44 determines that the qubit 18-7 is available for allocation within the QIZ Z2 and modifies the QIZ availability status 34 of the metadata record 28-7 to indicate that the corresponding qubit 18-7 has been allocated and thus is no longer available for allocation (e.g., "NA").

The QIZ controller 44 provides the qubit ID of the qubit 18-7 to the task manager 46. The task manager 46 initiates a quantum process 76 ("PE") into the QIZ Z2 with location information of the qubit 18-7. The task manager 46 provides a unique program ID (PID) ("PE_PID") of the quantum process 76 to the QIZ controller 44. The QIZ controller 44 generates a mapping record 78 that maps the PID to the QIZ Z2. The quantum process 60 is now said to "execute in" or be "associated with" the QIZ Z2.

Assume that, at the point in time illustrated in FIG. 1F, the quantum process 76 issues a request to the OS qubit interface 56 to obtain a list of qubit IDs of all qubits 18 to which the quantum process 76 has access (i.e., read access and/or write access) or which are available for allocation. The OS qubit interface 56 communicates with the QIZ controller 44. The QIZ controller 44 determines the PID of the requestor, in this case the PID PE_PID, which is the PID of the quantum process 76. The QIZ controller 44 accesses the mapping record 78 and determines that the quantum process 76 is associated with the QIZ Z2. The QIZ controller 44 accesses the metadata records 28 and determines that the qubits 18-7-18-11 have been allocated to the QIZ Z2, and that the qubits 18-8-18-11 are available. Because the qubit 18-7 has already been allocated to the quantum process 76 and the four qubits 18-8-18-11 are available, the QIZ controller 44 returns the qubit IDs of the qubits 18-7-18-11 to the quantum process 76 via the OS qubit interface 56, indicating that the quantum process 76 has access to the qubit 18-7, and that the qubits 18-8-18-11 are available for allocation. Thus, from the perspective of the quantum process 76, the quantum computing system 12 contains four available qubits 18, and the quantum process 76 is unaware of and unable to access (e.g., is isolated from) the qubits 18-1-18-6 and 18-12.

It is noted that because the QIZ controller 44 is a component of the quantum computing system 12, functionality implemented by the QIZ controller 44 may be attributed to the quantum computing system 12 generally. Moreover, in examples where the QIZ controller 44 comprises software instructions that program the processor device 14 to carry out functionality discussed herein, functionality implemented by the QIZ controller 44 may be attributed herein to the processor device 14.

Figure 2:
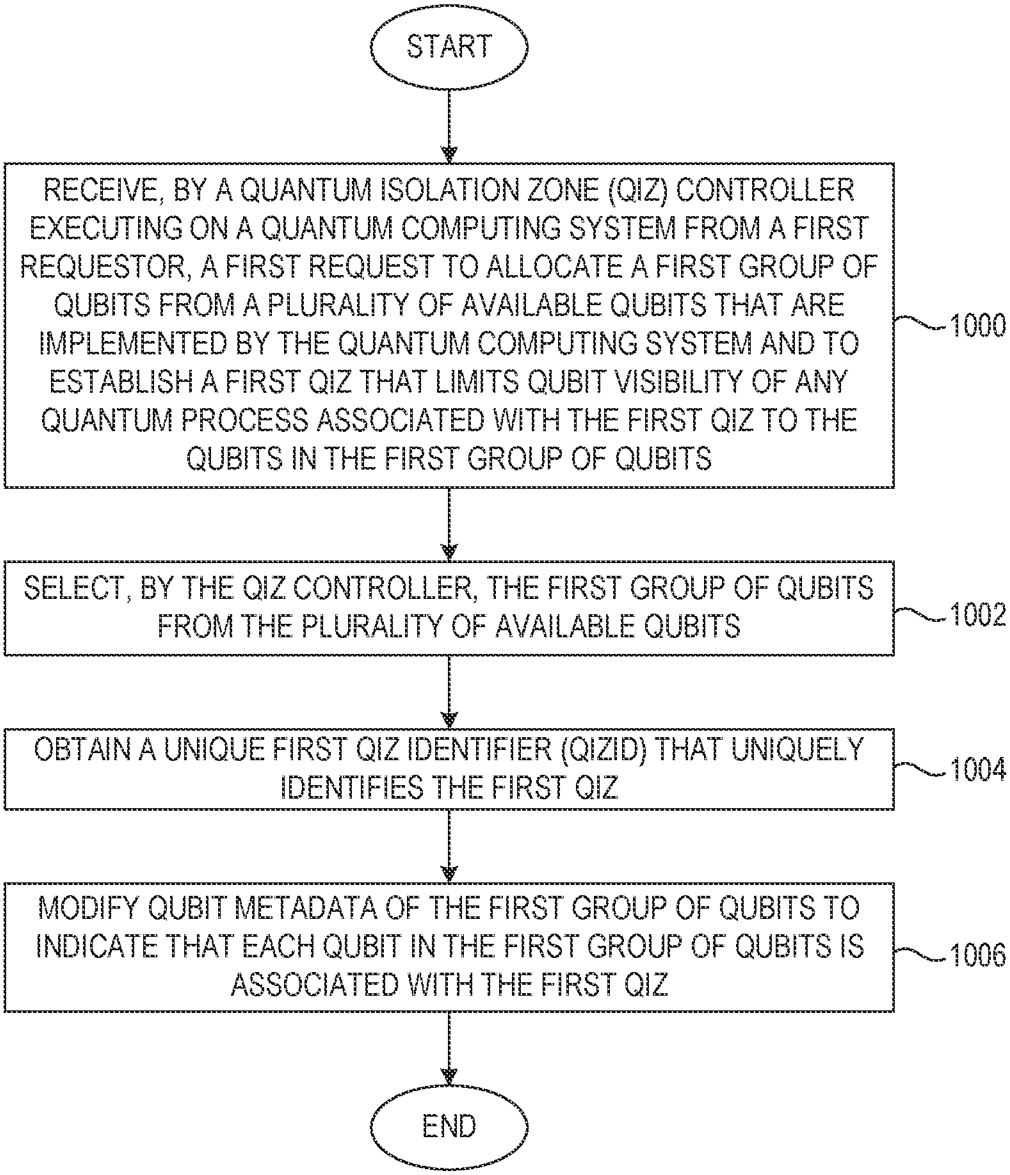
FIG. 2 is a flowchart of a method for implementing QIZs according to one implementation.

FIG. 2 is a flowchart of a method for implementing QIZs according to one implementation. FIG. 2 will be discussed in conjunction with FIGS. 1A-1F. The QIZ controller 44 receives, from a requestor, a request to allocate a group of the qubits 18 from the plurality of available qubits 18 that are implemented by the quantum computing system 12 and establish the QIZ Z1 that limits qubit visibility of any quantum process associated with the QIZ Z1 to only the qubits 18 in the group of qubits 18 (FIG. 2, block 1000). The QIZ controller 44 selects the first group of qubits 18-1-18-6 from the plurality of available qubits 18-1-18-12 (FIG. 2, block 1002). The QIZ controller 44 obtains the QIZ identifier (QIZID) Z1 that uniquely identifies the QIZ Z1 (FIG. 2, block 1004). The QIZ controller 44 modifies the qubit metadata records 28-1-28-6 of the group of qubits 18-1-18-6 to indicate that each qubit 18 in the group of qubits 18-1-18-6 is associated with the QIZ Z1 (FIG. 2, block 1006).

Figure 3:
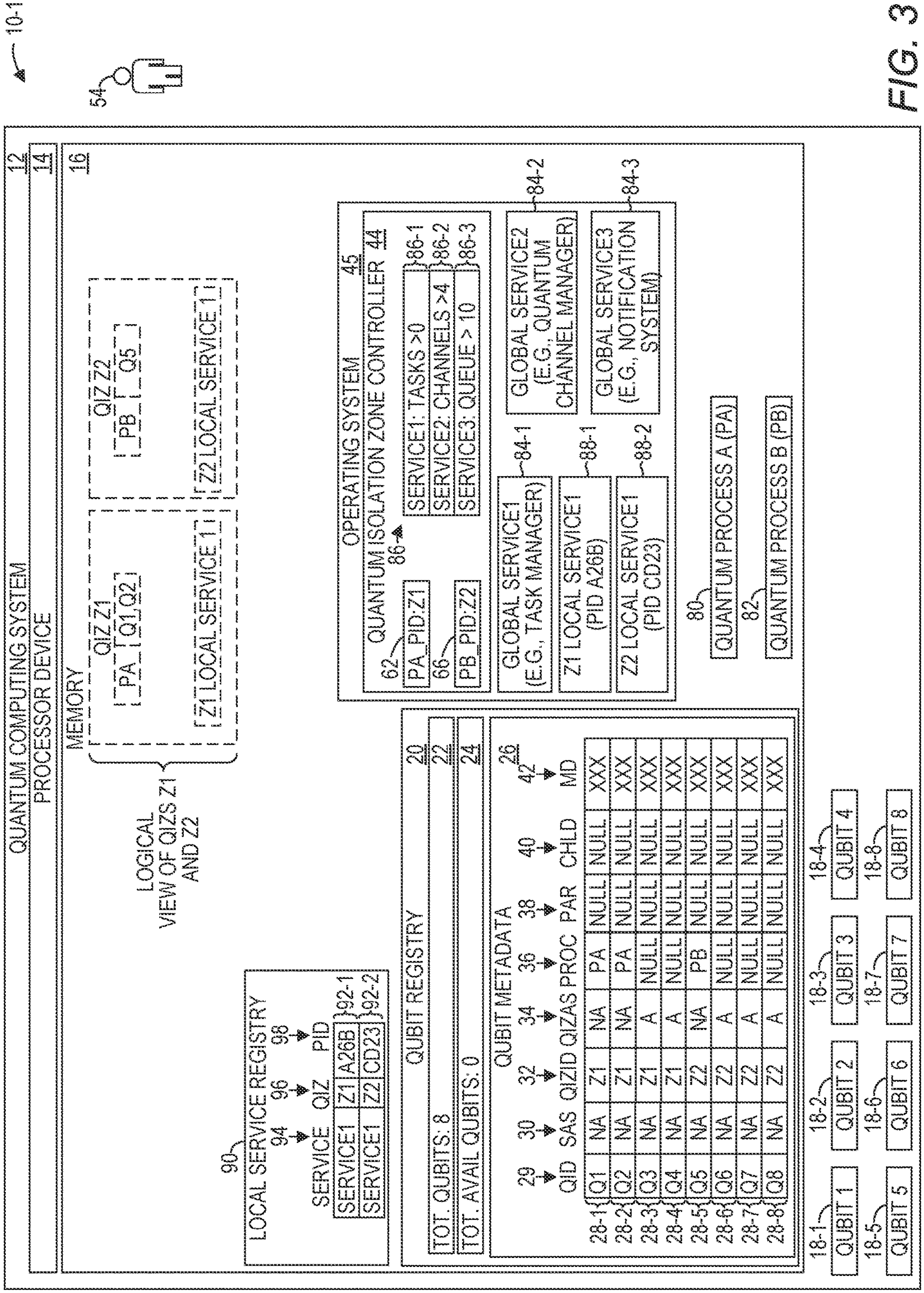
FIG. 3 is a block diagram of an environment for implementing local services in a QIZ according to one implementation.

FIG. 3 is a block diagram of an environment 10-1 for implementing local services in a QIZ according to one implementation. The environment 10-1 is substantially similar to the environment 10 except as otherwise noted herein. In this example, solely due to space constraints of FIG. 3, the quantum computing system 12 implements eight qubits 18-1-18-8. The QIZ controller 44 has established the QIZ Z1 and the QIZ Z2. The QIZ Z1 has been allocated the four qubits 18-1-18-4 and the QIZ Z2 has been allocated the four qubits 18-5-18-8. A quantum process 80 is associated with, or "executes in" the QIZ Z1 and has been allocated the qubits 18-1 and 18-2. A quantum process 82 is associated with, or "executes in" the QIZ Z2 and has been allocated the qubit 18-5.

The operating system 45 includes a plurality of global service instances 84-1-84-3. The term "instance" in this context refers to a running process. The global service instances 84-1-84-3 (generally global service instances 84) implement various services for processes that execute on the quantum computing system 12. The term "global service" refers to functionality that is offered to processes executing on the quantum computing system 12. As an example, the global service instance 84-1 may comprise a task manager that provides task management services for processes executing on the quantum computing system 12. The services provided by a global service instance 84 may be requested directly by a process executing on the quantum computing system 12, such as via an application programming interface, or indirectly in response to some requested operating system function, such as a read or write operation. The global service instances 84 may be kernel processes that run in kernel space, and/or execute at ring 0 level of the processor device 14.

The QIZ controller 44 makes a determination that a local service instance of the global service instance 84-1 should be initiated. The determination may be made in any number of ways. In one example, the QIZ controller 44 may make the determination in response to receiving a request to initiate the local service instance. For example, the operator 54 may submit a request via the QIZ allocation UI 52 to initiate, for a particular QIZ, a local service instance of the global service instance 84-1. In another example, the QIZ controller 44 may access a threshold criterion, or criteria, 86, which identify criteria via which the QIZ controller 44 should make the determination to initiate a local service instance. In this example, a criterion 86-1 indicates that a local service instance of the global service instance 84-1 should be initiated when a QIZ has at least one quantum process associated therewith. A criterion 86-2 indicates that a local service instance of the global service instance 84-2 should be initiated when quantum processes associated with a QIZ are utilizing more than four quantum channels. A criterion 86-3 indicates that a local service instance of the global service instance 84-3 should be initiated when a message queue depth of a quantum process executing in a QIZ has a queue depth greater than ten messages. When the QIZ controller 44 determines that a threshold criterion 86 has been exceeded, the QIZ controller 44 makes the determination to initiate a local service instance of the global service instance that corresponds to the particular threshold criterion 86.

In this example, the QIZ controller 44 has made the determination to initiate a local service instance of the global service instance 84-1 for the QIZ Z1. The QIZ controller 44 causes a local service instance 88-1 to be initiated. In one implementation, the QIZ controller 44 may cause the local service instance 88-1 to be initiated using, for example, a fork command to cause the local service instance 88-1 to be initiated as a child process of the QIZ controller 44. The local service instance 88-1 may run at a ring 0 level of the processor device 14 and thus execute in a kernel mode and a kernel space rather than as a user process in a user space.

The QIZ controller 44 modifies a local service data structure, in this example a local service registry 90, to indicate that the local service instance 88-1 is associated with the QIZ Z1. In particular, the QIZ controller 44 generates an entry 92-1 that includes a service identifier 94 that identifies the global service (e.g., "SERVICE1") that is implemented by the local service instance 88-1, a QIZ identifier 96 ("Z1") that identifies the QIZ with which the local service instance 88-1 is associated, and a program identifier (PID) 98 ("A26B") of the local service instance 88-1. In some examples, the QIZ controller 44 may immediately put the local service instance 88-1 into a "wait" or "suspended" state such that the local service instance 88-1 cannot service a request until awakened by the QIZ controller 44.

The QIZ controller 44 has also made the determination to initiate a local service instance of the global service instance 84-1 for the QIZ Z2. The QIZ controller 44 causes a local service instance 88-2 to be initiated. Again, the QIZ controller 44 may cause the local service instance 88-2 to be initiated using, for example, a fork command to cause the local service instance 88-2 to also be initiated as a child process of the QIZ controller 44. The local service instance 88-2 may run at a ring 0 level of the processor device 14 and thus execute in a kernel mode and a kernel space rather than as a user process in a user space.

The QIZ controller 44 modifies the local service registry 90 to indicate that the local service instance 88-2 is associated with the QIZ Z2. In particular, the QIZ controller 44 generates an entry 92-2 that includes a service identifier 94 that identifies the global service (e.g., "SERVICE1") that is implemented by the local service instance 88-2, a QIZ identifier 96 ("Z2") that identifies the QIZ with which the local service instance 88-2 is associated, and a program identifier (PID) 98 ("CD23") of the local service instance 88-2.

Subsequently, the QIZ controller 44 determines that the quantum process 80 has issued a service request for a service provided by the global service instance 84-1. In some examples, the operating system 45 may be designed to route service requests for any global service made by any executing process to the QIZ controller 44 rather than directly to the global service instance that would normally service the request. For example, reads, writes, or any other attempt to access hardware or memory may be transparently routed by the operating system 45 to the QIZ controller 44. Any application programming interface (API) call made by an executing process may similarly be examined by the operating system 45, and if the API call is associated with a global service, first routed to the QIZ controller 44.

The QIZ controller 44 may determine, in conjunction with determining that the service request has been issued, that the request has originated from the particular quantum process 80, and/or the QIZ Z1. For example, in conjunction with routing a service request to the QIZ controller 44, the operating system 45 may include information that identifies the originator of the request, in this example the quantum process 80, and the QIZ with which the originator is associated, in this example, the QIZ Z1.

The QIZ controller 44 accesses the local service registry 90 and, based on the entry 92-1, determines that the local service instance 88-1 is associated with the QIZ Z1 and is a local service instance of the global service instance 84-1. If the QIZ controller 44 caused the local service instance 88-1 to go into a "wait" or "suspended" state, the QIZ controller 44 awakens the local service instance 88-1 so that the local service instance 88-1 can service the service request. The QIZ controller 44 then provides the service request to the local service instance 88-1 in lieu of providing the service request to the global service instance 84-1. The local service instance 88-1 receives the service request and provides the requested service for the quantum process 80. Subsequent to servicing the service request, the QIZ controller 44 may again place the local service instance 88-1 into a "wait" or "suspended" state.

The QIZ controller 44 then determines that the quantum process 82 has issued a service request for a service provided by the global service instance 84-1. The QIZ controller 44 accesses the local service registry 90 and, based on the entry 92-2, determines that the local service instance 88-2 is associated with the QIZ Z2 and is a local service instance of the global service instance 84-1. The QIZ controller 44 then provides the service request to the local service instance 88-2 in lieu of providing the service request to the global service instance 84-1. The local service instance 88-2 receives the service request and provides the requested service for the quantum process 82.

Figure 4:
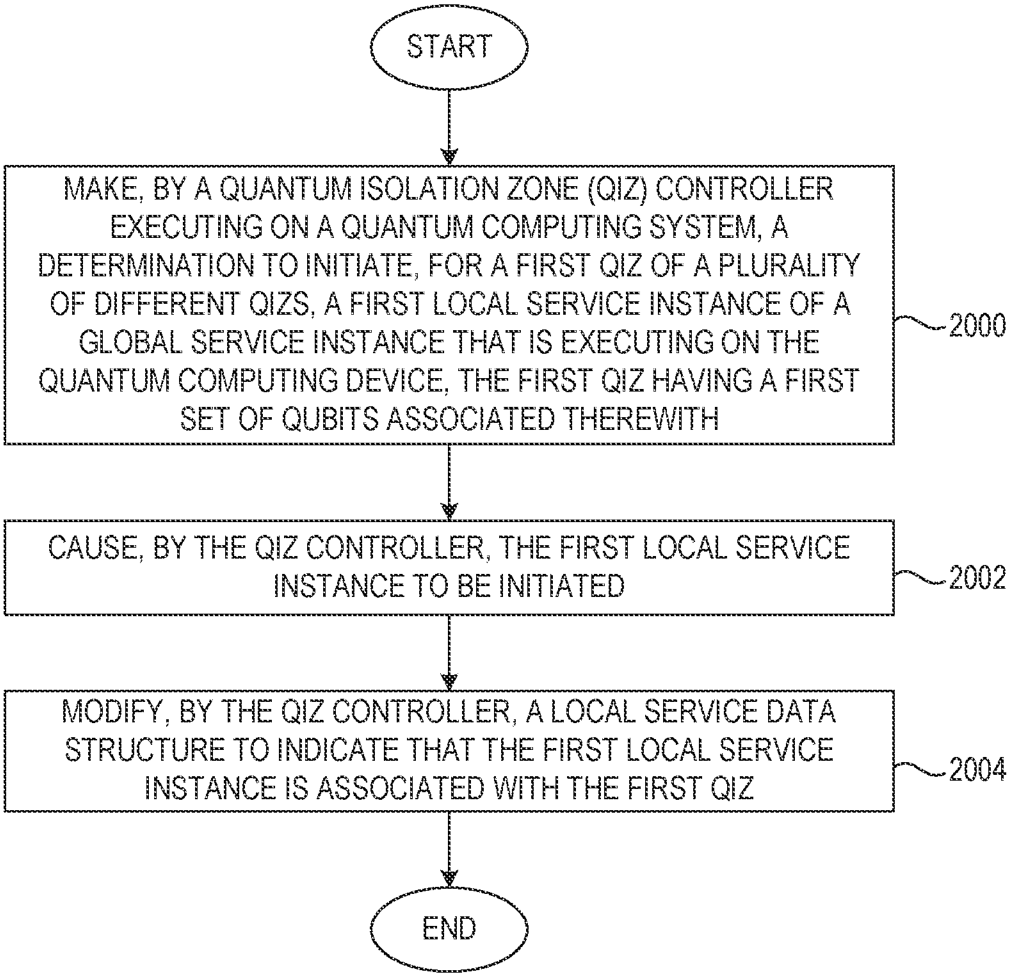
FIG. 4 is a flowchart of a method for implementing a local service instance in a QIZ according to one implementation.

FIG. 4 is a flowchart of a method for implementing a local service instance in a QIZ according to one implementation. FIG. 4 will be discussed in conjunction with FIG. 3. The QIZ controller 44 makes a determination to initiate, for the QIZ Z1 of the plurality of different QIZs, a local service instance of the global service instance 84-1 that is executing on the quantum computing system 12, the QIZ Z1 having the set of qubits 18-1-18-4 associated therewith (FIG. 4, block 2000). The QIZ controller 44 causes the local service instance 88-1 to be initiated (FIG. 4, block 2002). The QIZ controller modifies the local service data structure such as the local service registry 90 to indicate that the local service instance 88-1 is associated with the QIZ Z1 (FIG. 4, block 2004).

Figure 5:
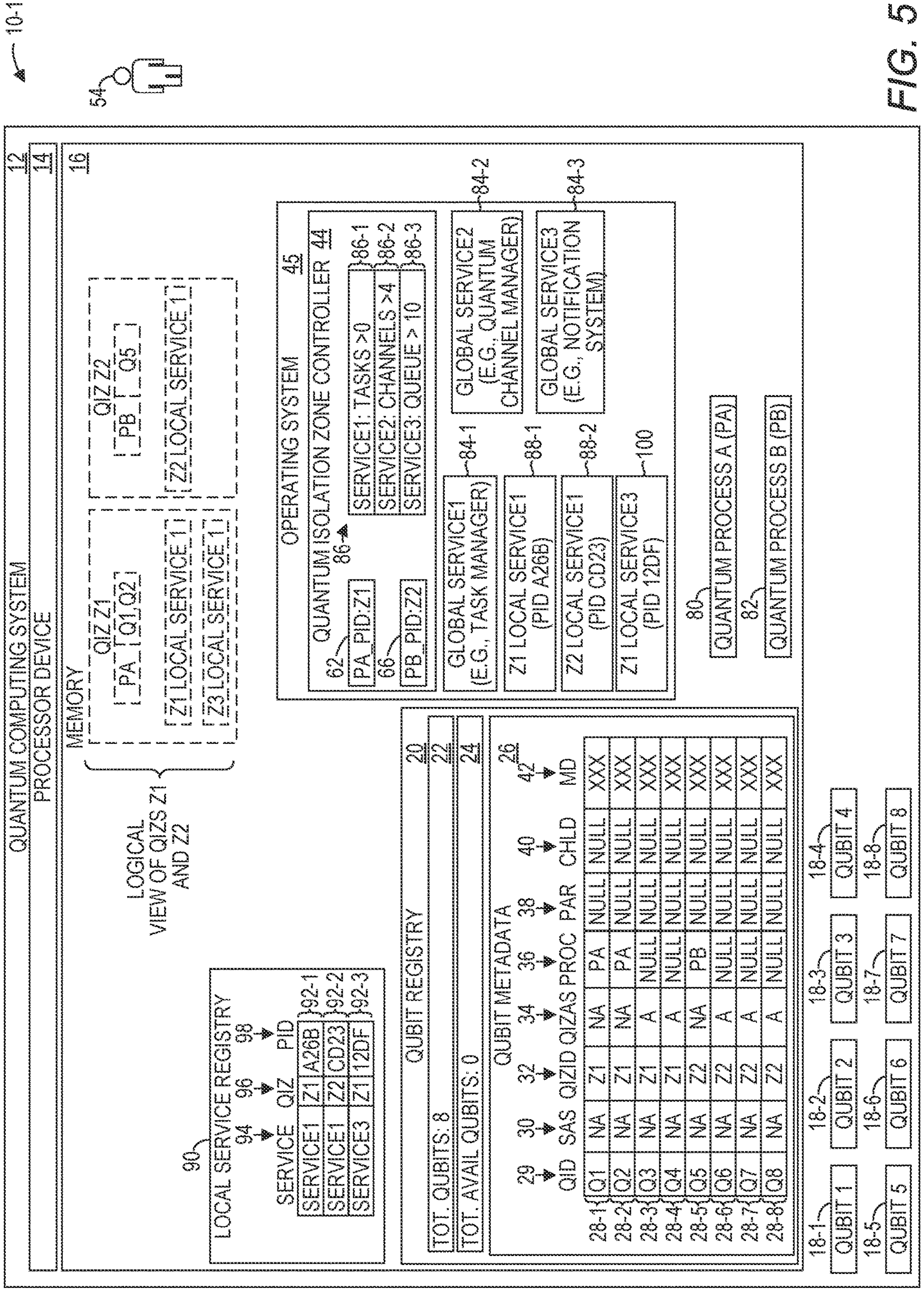
FIG. 5 is a block diagram of the environment illustrated in FIG. 3 at a subsequent point in time to that illustrated in FIG. 3 according to one implementation.

FIG. 5 is a block diagram of the environment 10-1 at a subsequent point in time to that illustrated in FIG. 3 according to one implementation. The QIZ controller 44 may periodically monitor the threshold criteria 86 to determine if a local service instance is to be initiated. In this example, the QIZ controller 44 determines that a queue depth of the quantum process 80 has exceeded a depth of 10. The QIZ controller 44 causes a local service instance 100 of the global service instance 84-3 to be initiated. In one implementation, the QIZ controller 44 may cause the local service instance 100 to be initiated using, for example, a fork command to cause the local service instance 100 to be initiated as a child process of the QIZ controller 44. The local service instance 100 may run at a ring 0 level of the processor device 14 and thus execute in a kernel mode and a kernel space rather than as a user process in a user space.

The QIZ controller 44 modifies the local service registry 90 to indicate that the local service instance 100 is associated with the QIZ Z1. In particular, the QIZ controller 44 generates an entry 92-3 that includes a service identifier 94 that identifies the global service (e.g., "SERVICE3") that is implemented by the local service instance 100, a QIZ identifier 96 ("Z1") that identifies the QIZ with which the local service instance 100 is associated, and a program identifier (PID) 98 ("12DF") of the local service instance 100.

Subsequently, the QIZ controller 44 determines that the quantum process 80 has issued a service request for a service provided by the global service instance 84-3. The QIZ controller 44 accesses the local service registry 90 and, based on the entry 92-3, determines that the local service instance 100 is associated with the QIZ Z1 and is a local service instance of the global service instance 84-3. The QIZ controller 44 then provides the service request to the local service instance 100 in lieu of providing the service request to the global service instance 84-3. The local service instance 100 receives the service request and provides the requested service for the quantum process 80.

The QIZ controller 44 then determines that the quantum process 82 has issued a service request for a service provided by the global service instance 84-3. The QIZ controller 44 accesses the local service registry 90 and determines that the QIZ Z2 lacks a local service instance of the global service instance 84-3. The QIZ controller 44 provides the service request to the global service instance 84-3.

Figure 6A:
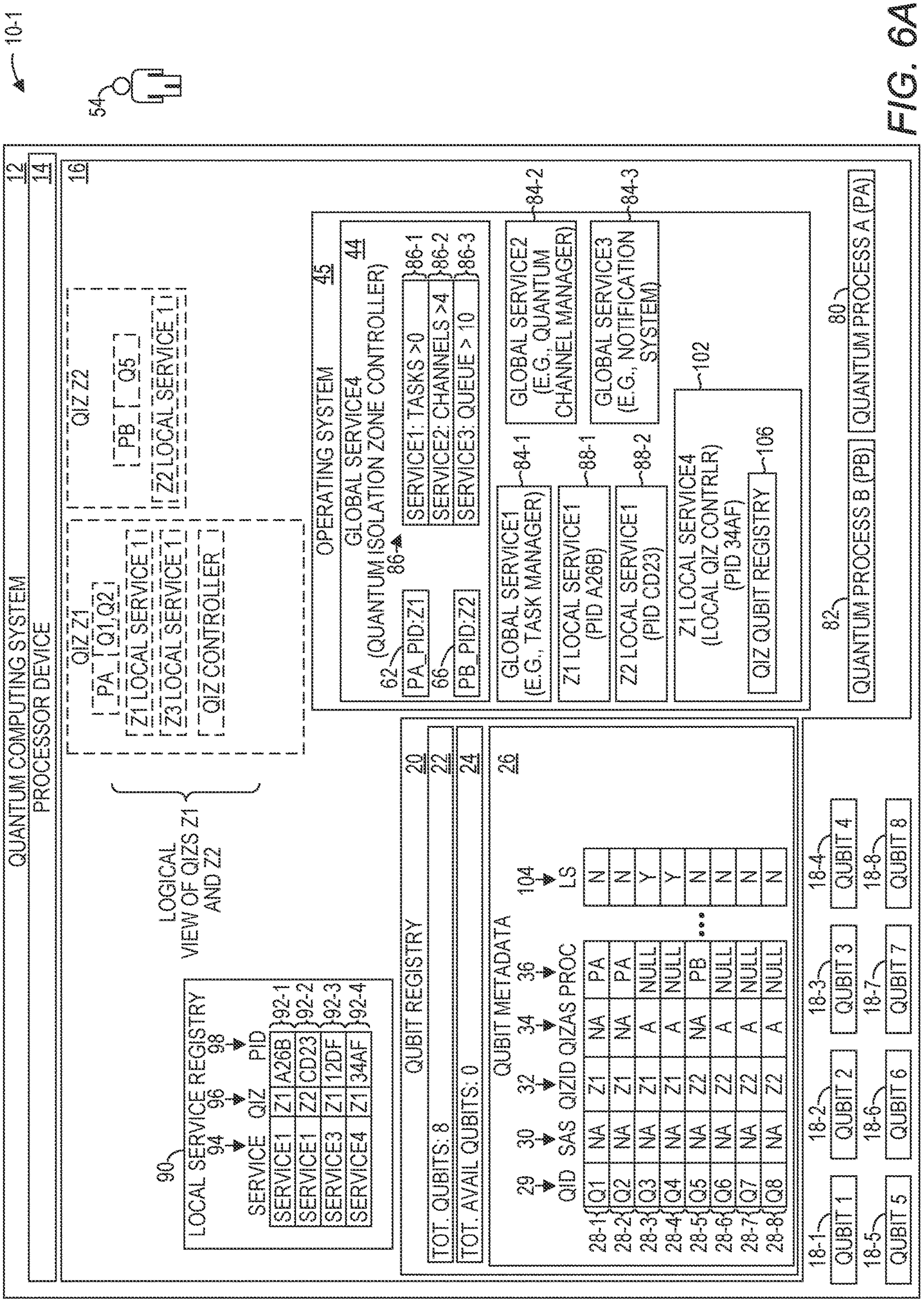
FIGS. 6A-6F illustrate the environment illustrated in FIGS. 3 and 5 according to another implementation.

FIGS. 6A-6F illustrate the environment 10-1 according to another implementation. Referring first to FIG. 6A, the QIZ controller 44 is itself a global service having an identifier of SERVICE4. The QIZ controller 44 receives a request to initiate a local service instance of the QIZ controller service (i.e., SERVICE4) for the QIZ Z1. The request also indicates that two qubits 18 are to be allocated to the local service instance. The request may be made, for example, from the operator 54. The QIZ controller 44 causes a local service instance 102 (hereinafter referred to as the "local QIZ controller 102" for purposes of simplicity) to be initiated. Again, the local QIZ controller 102 may run at a ring 0 level of the processor device 14 and thus execute in a kernel mode and a kernel space rather than as a user process in a user space. The QIZ controller 44 modifies the local service registry 90 to indicate that the local QIZ controller 102 is associated with the QIZ Z1. In particular, the QIZ controller 44 generates an entry 92-4 that includes a service identifier 94 that identifies the global service (e.g., "SERVICE4") that is implemented by the local QIZ controller 102, a QIZ identifier 96 ("Z1") that identifies the QIZ with which the local QIZ controller 102 is associated, and a program identifier (PID) 98 ("34AF") of the local QIZ controller 102.

Based on the metadata records 28-3 and 28-4, the QIZ controller 44 determines that the QIZ Z1 has two available qubits 18-3 and 18-4 that can be allocated to the local QIZ controller 102. If the QIZ Z1 did not have a sufficient number of qubits 18 to be allocated to the local QIZ controller 102, the QIZ controller 44 would determine if the quantum computing system 12 had available qubits 18 that could be allocated to the QIZ Z1. If so, the QIZ controller 44 would allocate sufficient qubits 18 to the QIZ Z1, and then allocate two of such qubits 18 to the local QIZ controller 102.

The QIZ controller 44 modifies a local service flag 104 of the metadata records 28-3 and 28-4 to indicate that the qubits 18-3 and 18-4 are now under control of the local QIZ controller 102. The QIZ controller 44 sends, to the local QIZ controller 102, the information identified in the metadata records 28-3 and 28-4. The local QIZ controller 102 receives the information and generates a qubit registry 106 and populates the qubit registry 106 based on the metadata records 28-3 and 28-4.

Figure 6B:
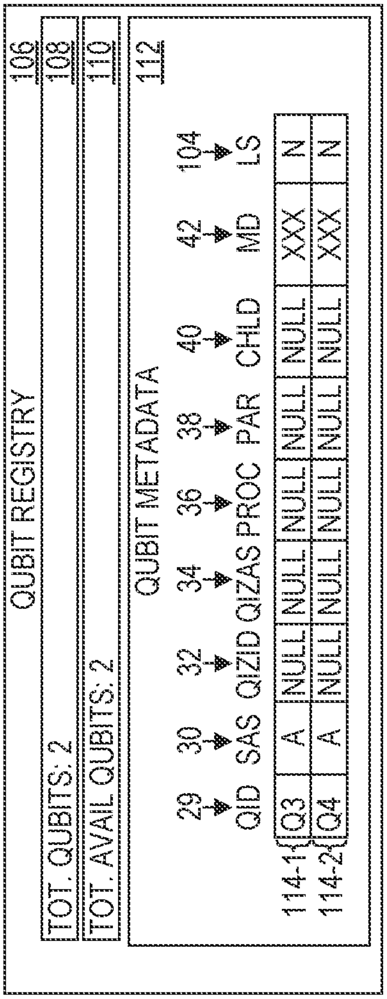

Referring now to FIG. 6B, a block diagram of the qubit registry 106 is illustrated. The qubit registry 106 includes a total qubits counter 108 that identifies the total number of qubits 18 controlled by the local QIZ controller 102, and a total available qubits counter 110 that maintains count of the total number of qubits 18 that are currently available for allocation by the local QIZ controller 102. The qubit registry 106 contains qubit metadata 112, which comprises a plurality of metadata records 114-1-114-2 (generally, metadata records 114), each of which maintains information about a corresponding qubit 18-3-18-4. Each metadata record 114 includes the qubit identifier (QID) 29 that contains an identifier of the qubit 18-3-18-4 to which the respective metadata record 114 corresponds, the system availability status (SAS) 30 that identifies whether the corresponding qubit 18 is available for allocation to a QIZ controlled by the local QIZ controller 102, the QIZ identifier (QIZID) 32 that identifies the QIZ, if any, to which the corresponding qubit 18 has been allocated, and the QIZ availability status (QIZAS) 34 that identifies whether the corresponding qubit 18, if allocated to a QIZ, is available in the QIZ or has been allocated to a quantum process executing in the QIZ. Each metadata record 114 also includes the process identifier 36 of the quantum process, if any, to which the corresponding qubit 18 has been allocated, the parent identifier 38 that identifies the parent quantum process, if any, of the quantum process to which the corresponding qubit 18 has been assigned, and the child identifier 40 that identifies the child quantum process, if any, of the quantum process to which the corresponding qubit 18 has been assigned. Each metadata record 114 may also include additional metadata 42 not relevant to the examples disclosed herein, such as metadata indicating the real-time state of the corresponding qubit 18, such as whether the qubit 18 is in an entangled state, is in superposition, the type of qubit 18, or the like.

Figure 6C:
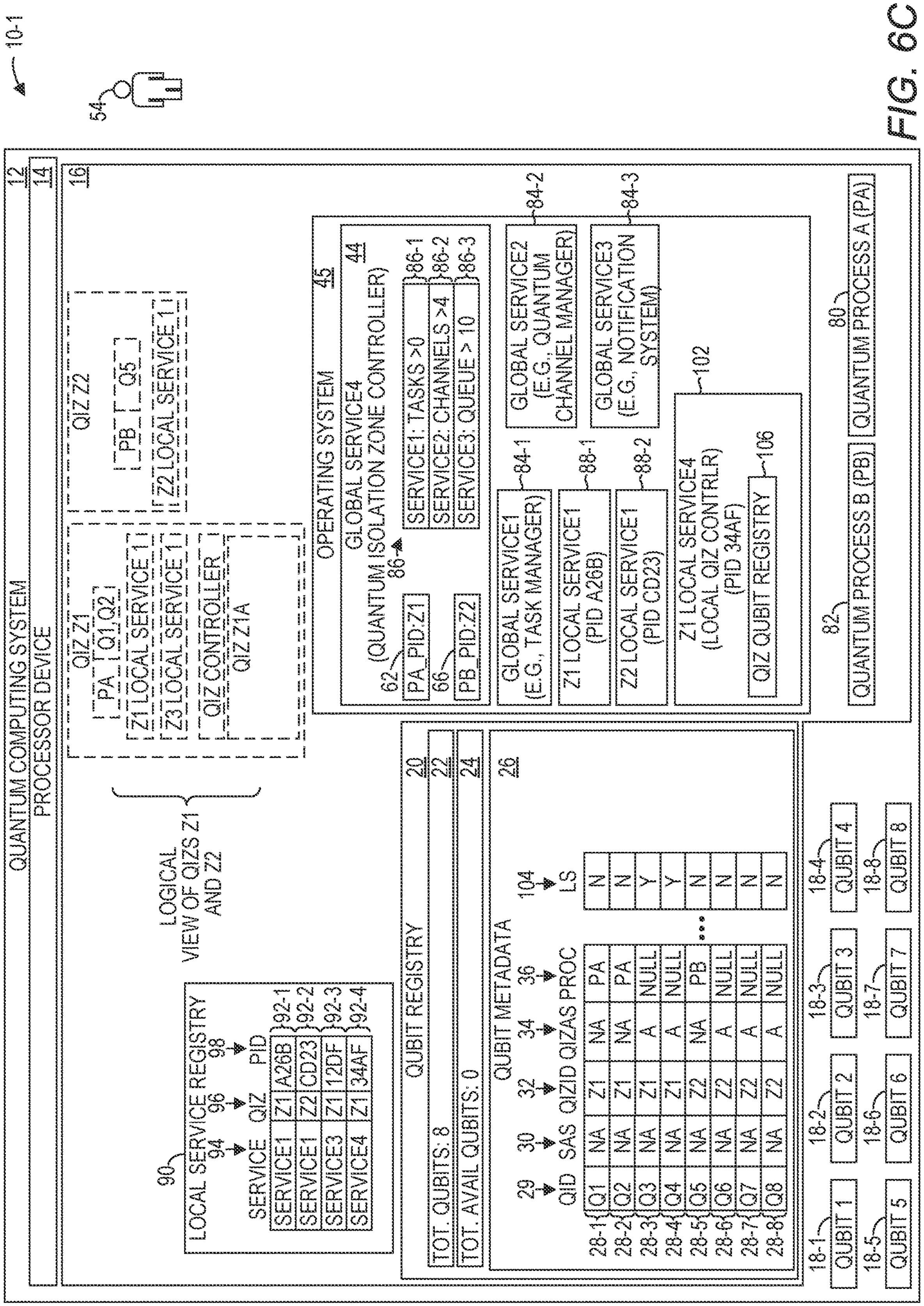

Referring now to FIG. 6C, assume that the local QIZ controller 102 receives a request from a requestor to allocate a first group of qubits 18 from available qubits 18 to establish a QIZ that limits visibility of any quantum process associated with the first QIZ to only the qubits 18 in the first group of qubits 18. The request may identify the number of qubits 18 and, if applicable, other criteria, such as a particular type of qubit, or any other desired characteristics of the qubits 18.

In one example, the requestor may be the QIZ allocation UI 52 which makes the request in response to input from the operator 54. In another example, the request may be a programmatic request from a process, such as the quantum process 80, executing on the quantum computing system 12 within the QIZ Z1. In this example, the request indicates that two qubits 18 are to be allocated to the QIZ. The local QIZ controller 102 accesses the qubit metadata 112 and identifies the two qubits 18-3 and 18-4 that have a system availability status 30 that indicates the qubits 18-3 and 18-4 are available for allocation to a QIZ.

The local QIZ controller 102 modifies the system availability status 30 of the metadata records 114-1 and 114-2 with a value of "NA" (not available) to indicate that the two qubits 18-3-18-4 are no longer available for allocation. The local QIZ controller 102 obtains a unique QIZ identifier, in this example, "Z1A", and modifies the QIZ ID 32 to indicate that the two qubits 18-3-18-4 have been allocated to the QIZ Z1A. The local QIZ controller 102 may generate the unique QIZ ID or be provided the unique QIZ ID by the requestor or some other mechanism. The local QIZ controller 102 modifies the QIZ availability status 34 to indicate that the two qubits 18-13-18-4 are available for allocation within the QIZ Z1A. The local QIZ controller 102 modifies the total available qubits counter 110 to indicate that no qubits 18 are now available for allocation to a QIZ.

For purposes of illustration, a logical QIZ Z1A is illustrated in dashed lines in FIG. 6C to facilitate an understanding of the isolation and relationship aspects of QIZs implemented by the examples herein. However, it should be understood that the QIZ Z1A illustrated in the Figures in dashed outline is a logical depiction only provided for ease of understanding and that the functionality of the QIZ Z1A is implemented via the local QIZ controller 102, the qubit metadata 112, and other components as described herein.

Figure 6D:
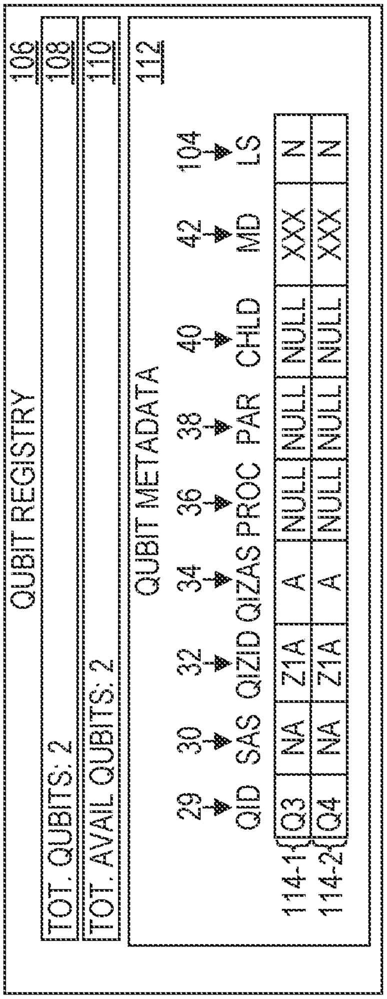

Referring now to FIG. 6D, a block diagram of the qubit registry 106 is illustrated showing a state of the qubit registry 106 after the generation of the QIZ Z1A and prior to the initiation of a quantum process in the QIZ Z1A and allocation of qubits 18 to such quantum process.

Figure 6E:
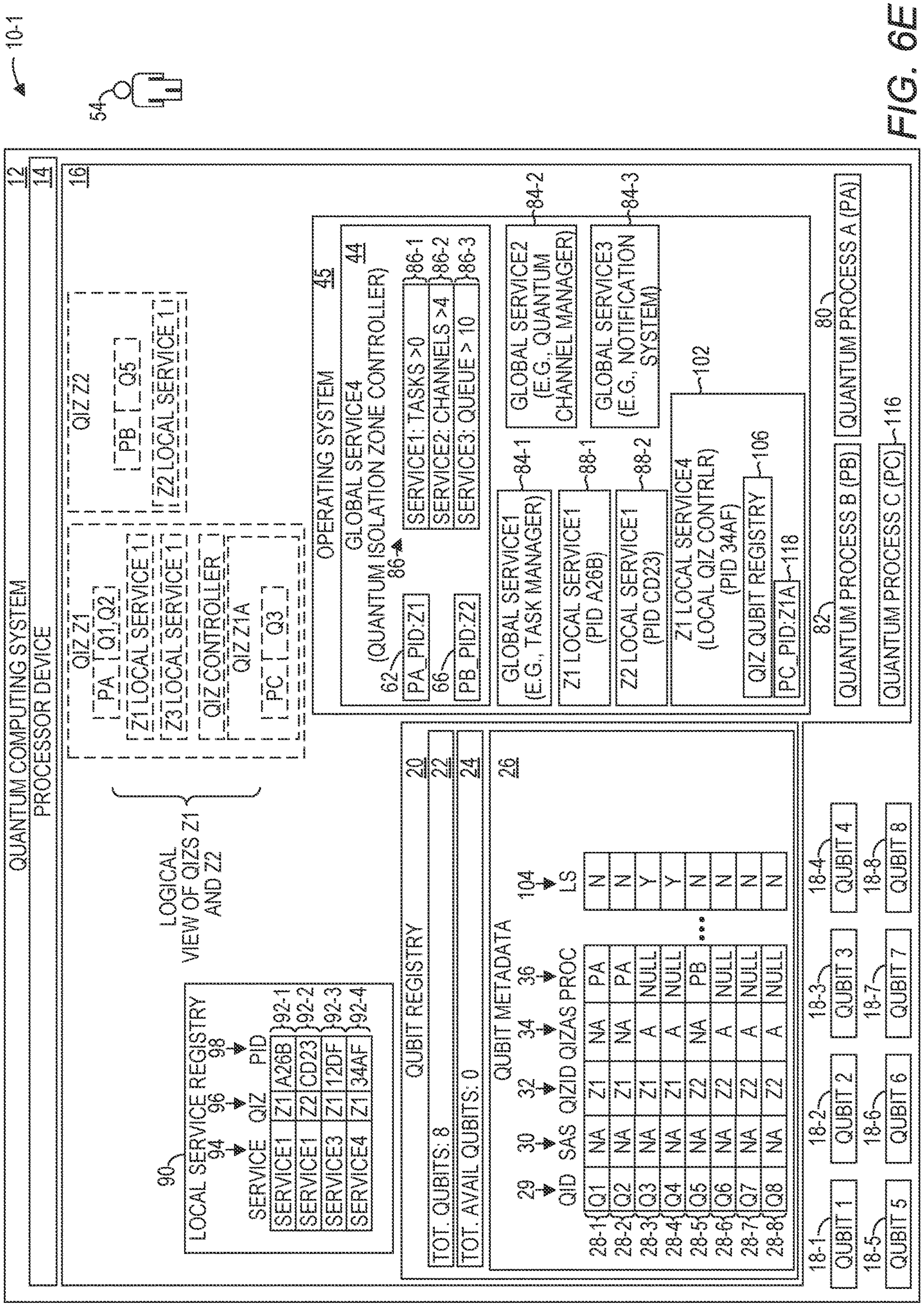

Referring now to FIG. 6E, assume that a service request is directed to the global service instance 84-1 (i.e., the "task manager" in this example) to initiate a quantum process into the QIZ Z1A. The request may be contained in a schedule, may be generated programmatically, or may be initiated via input from the operator 54. The QIZ controller 44, as discussed above with regard to FIG. 3, determines that the service request has been made and is associated with the QIZ Z1. The QIZ controller 44 accesses the local service registry 90 and, based on the entry 92-1, determines that the local service instance 88-1 is associated with the QIZ Z1 and is a local service instance of the global service instance 84-1. The QIZ controller 44 then provides the service request to the local service instance 88-1 in lieu of providing the service request to the global service instance 84-1.

The local service instance 88-1 receives the service request and accesses the QASM file that corresponds to the quantum process to be executed. The local service instance 88-1 determines that the quantum process to be executed will utilize one qubit 18. The local service instance 88-1 sends a service request to the QIZ controller 44 for an allocation of one qubit 18 from the QIZ Z1A. The QIZ controller 44 determines that the service request has been made and is associated with the QIZ Z1. The QIZ controller 44 accesses the local service registry 90 and, based on the entry 92-4, determines that the local service instance 102 is associated with the QIZ Z1 and is a local service instance of the global service instance 44 (i.e., the QIZ controller 44). The QIZ controller 44 then provides the service request to the local QIZ controller 102. The local QIZ controller 102 receives the service request to allocate one qubit 18 in the QIZ Z1A to a quantum process that is, or will be, associated with the QIZ Z1A. Based on the metadata records 114, the local QIZ controller 102 determines that the qubit 18-3 is available for allocation within the QIZ Z1A. The local QIZ controller 102 modifies the QIZ availability status 34 of the metadata record 114-1 to indicate that the corresponding qubit 18-3 has been allocated and thus is no longer available for allocation (e.g., "NA"). The local QIZ controller 102 provides the qubit ID of the qubit 18-3 to the local service instance 88-1. The local service instance 88-1 initiates a quantum process 116 ("PC") into the QIZ Z1A with location/address information of the qubit 18-3. The local service instance 88-1 provides a unique program ID (PID) of the quantum process 116 ("PC_PID") to the local QIZ controller 102. The local QIZ controller 102 maintains a mapping record 118 that maps the PID to the QIZ Z1A. The quantum process 116 is now said to "execute in" or be "associated with" the QIZ Z1A, because the visibility of and access to the qubit 18-3 is now constrained by the QIZ Z1A.

As an example, assume that the quantum process 116 issues a request to the OS qubit interface 56 to obtain a list of qubit IDs of all qubits 18 to which the quantum process 116 has access (i.e., read access and/or write access) or which are available for allocation. The OS qubit interface 56 communicates with the QIZ controller 44. The QIZ controller 44 accesses the local service registry 90 and, based on the entry 92-4, determines that the local QIZ controller 102 is associated with the QIZ Z1A and is a local service instance of the QIZ controller 44. The QIZ controller 44 then provides the service request to the local QIZ controller 102. The local QIZ controller 102 determines the PID of the requestor, in this case the PID PC_PID, which is the PID of the quantum process 116. The local QIZ controller 102 accesses the mapping record 118 and determines that the quantum process 116 is associated with the QIZ Z1A. The local QIZ controller 102 accesses the metadata records 114 and determines that the qubits 18-3-18-4 have been allocated to the QIZ Z1A, and that the qubit 18-4 is available. Because the qubit 18-3 has already been allocated to the quantum process 116, and the qubit 18-4 is available, the local QIZ controller 102 returns the qubit IDs of the qubits 18-3-18-4 to the quantum process 116, indicating that the quantum process 116 has access to the qubit 18-3 and that the qubit 18-4 is available for allocation. In this manner, the quantum computing system 12 implements nested QIZs.

Figure 6F:
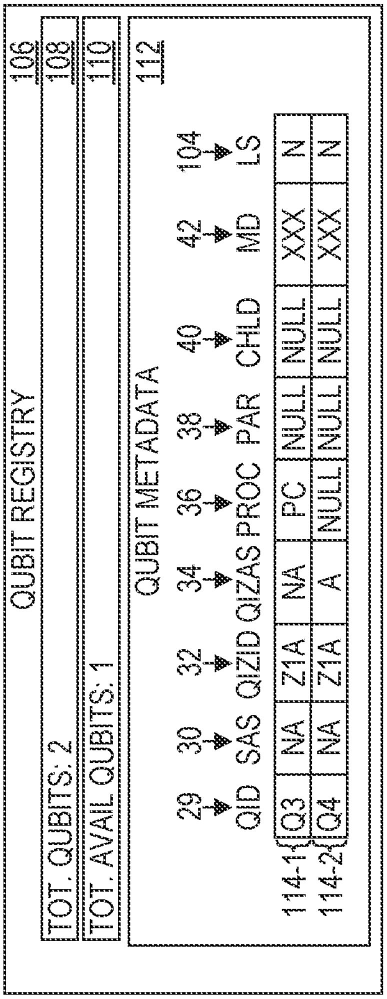

Referring now to FIG. 6F, a block diagram of the qubit registry 106 is illustrated showing a state of the qubit registry 106 after the initiation of the quantum process 116 into the QIZ Z1A.

Figure 7:
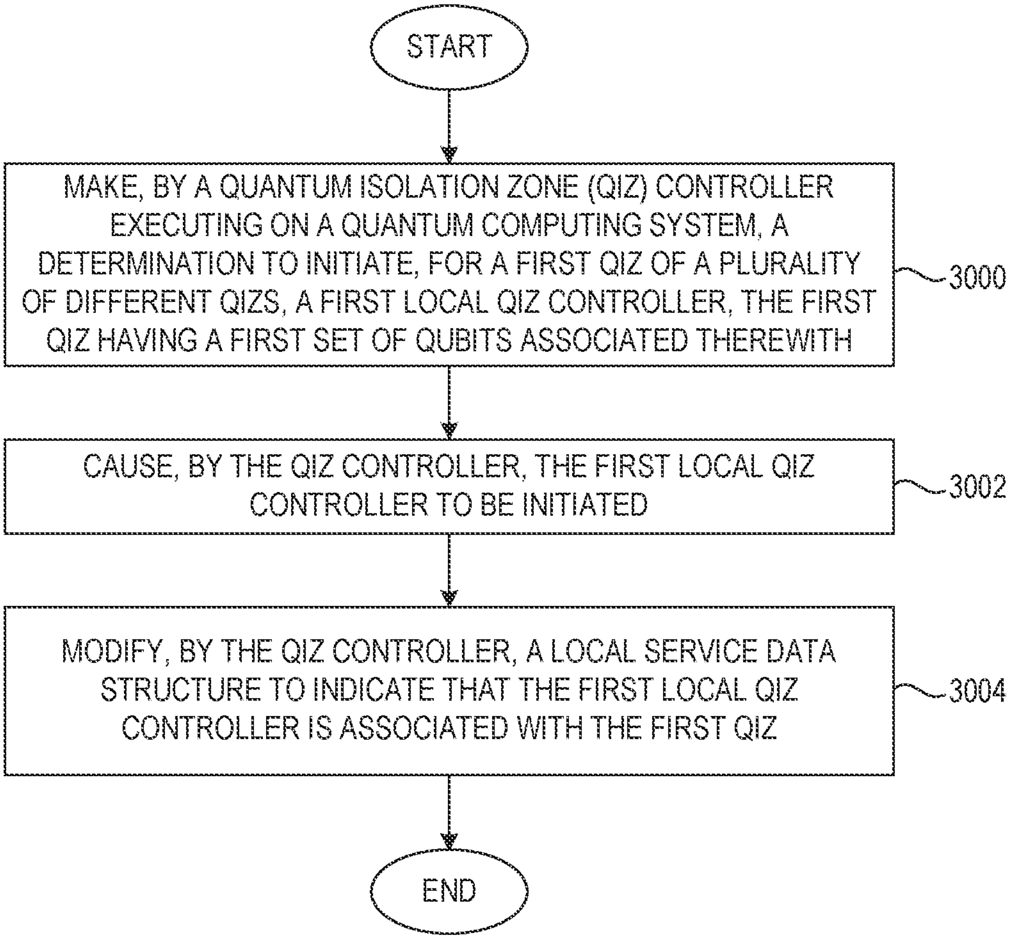
FIG. 7 is a flowchart of a method for implementing nested QIZs according to one implementation.

FIG. 7 is a flowchart of a method for implementing nested QIZ controllers according to one implementation. FIG. 7 will be discussed in conjunction with FIGS. 6A-6F. The QIZ controller 44 makes a determination to initiate, for the QIZ Z1 of the plurality of different QIZs, the local QIZ controller 102, the QIZ Z1 having the set of qubits 18-1-18-4 associated therewith (FIG. 7, block 3000). The QIZ controller 44 causes the local QIZ controller 102 to be initiated (FIG. 7, block 3002). The QIZ controller 44 modifies the local service data structure 90 to indicate that the local QIZ controller 102 is associated with the QIZ Z1 (FIG. 7, block 3004).

Figure 8:
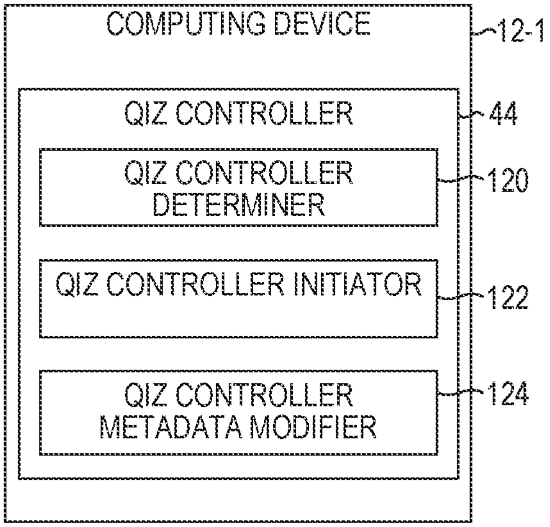
FIG. 8 is a block diagram of a quantum computing system suitable for implementing aspects illustrated in FIG. 3 according to one implementation.

FIG. 8 is a block diagram of a quantum computing system 12-1 according to one implementation. The quantum computing system 12-1 implements identical functionality as that described above with regard to the quantum computing system 12. In this implementation the QIZ controller 44 may implement the functionality described herein via various components, or modules. The QIZ controller 44 may include a QIZ controller determiner 120 to determine, for the QIZ Z1 of the plurality of different QIZs, that a local service instance of the global service instance 84-1 that is executing on the quantum computing system 12 is to be initiated, the QIZ Z1 having the set of qubits 18-1-18-4 associated therewith. The determination may be made in any number of ways. In one example, the QIZ controller determiner 120 may make the determination in response to receiving a request to the initiate the local service instance. For example, the operator 54 may submit a request via the QIZ allocation UI 52 to initiate, for a particular QIZ, a local service instance of the global service instance 84-1. In another example, the QIZ controller determiner 120 may utilize the threshold criteria 86 to make the determination to initiate a local service instance. In other examples, the determination may be made in response to a programmatic request to initiate the local service instance. The QIZ controller determiner 120 may comprise executable software instructions to program the processor device 14 to implement the functionality of determining, for the QIZ Z1 of the plurality of different QIZs, that a local service instance of the global service instance 84-1 that is executing on the quantum computing system 12 is to be initiated, may comprise circuitry including, by way of non-limiting example, an application-specific integrated circuit (ASIC), field-programmable gate array (FPGA), or may comprise a combination of executable software instructions and circuitry.

The QIZ controller 44 may also include a QIZ controller initiator 122 to cause the local service instance 88-1 to be initiated. The QIZ controller initiator 122 may comprise executable software instructions to program the processor device 14 to implement the functionality of causing the local service instance 88-1 to be initiated, may comprise circuitry including, by way of non-limiting example, an application-specific integrated circuit (ASIC), field-programmable gate array (FPGA), or may comprise a combination of executable software instructions and circuitry.

The QIZ controller 44 may also include a QIZ controller metadata modifier 124 to modify the local service data structure, such as the local service registry 90, to indicate that the local service instance 88-1 is associated with the QIZ Z1. The QIZ controller metadata modifier 124 may comprise executable software instructions to program the processor device 14 to implement the functionality of modifying the local service data structure, such as the local service registry 90, to indicate that the local service instance 88-1 is associated with the QIZ Z1, may comprise circuitry including, by way of non-limiting example, an application-specific integrated circuit (ASIC), field-programmable gate array (FPGA), or may comprise a combination of executable software instructions and circuitry.

Figure 9:
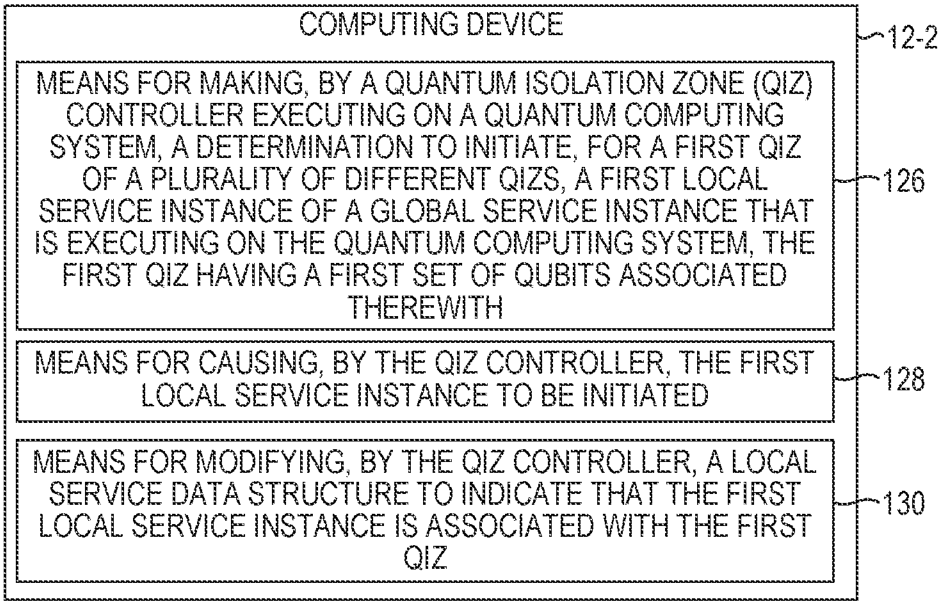
FIG. 9 is a block diagram of a quantum computing system suitable for implementing aspects illustrated in FIG. 3 according to another implementation.

FIG. 9 is a block diagram of a quantum computing system 12-2 according to additional implementations. The quantum computing system 12-2 implements identical functionality as that described above with regard to the quantum computing systems 12 and 12-1. The quantum computing system 12-2 includes means 126 for making, by the QIZ controller 44 executing on the quantum computing system 12-2, a determination to initiate, for the QIZ Z1 of the plurality of different QIZs, a local service instance of the global service instance 84-1 that is executing on the quantum computing system 12-2, the QIZ Z1 having the set of qubits 18-1-18-4 associated therewith. The means 126 may be implemented in any number of manners, including, for example, via the QIZ controller determiner 120 illustrated in FIG. 8.

The quantum computing system 12-2 includes means 128 for causing, by the QIZ controller 44, the local service instance 88-1 to be initiated. The means 128 may be implemented in any number of manners, including, for example, via the QIZ controller initiator 122 illustrated in FIG. 8.

The quantum computing system 12-2 includes means 130 for modifying, by the QIZ controller 44, the local service data structure, such as the local service registry 90, to indicate that the local service instance 88-1 is associated with the QIZ Z1. The means 130 may be implemented in any number of manners, including, for example, via the QIZ controller metadata modifier 124 122 illustrated in FIG. 8.

Figure 10:
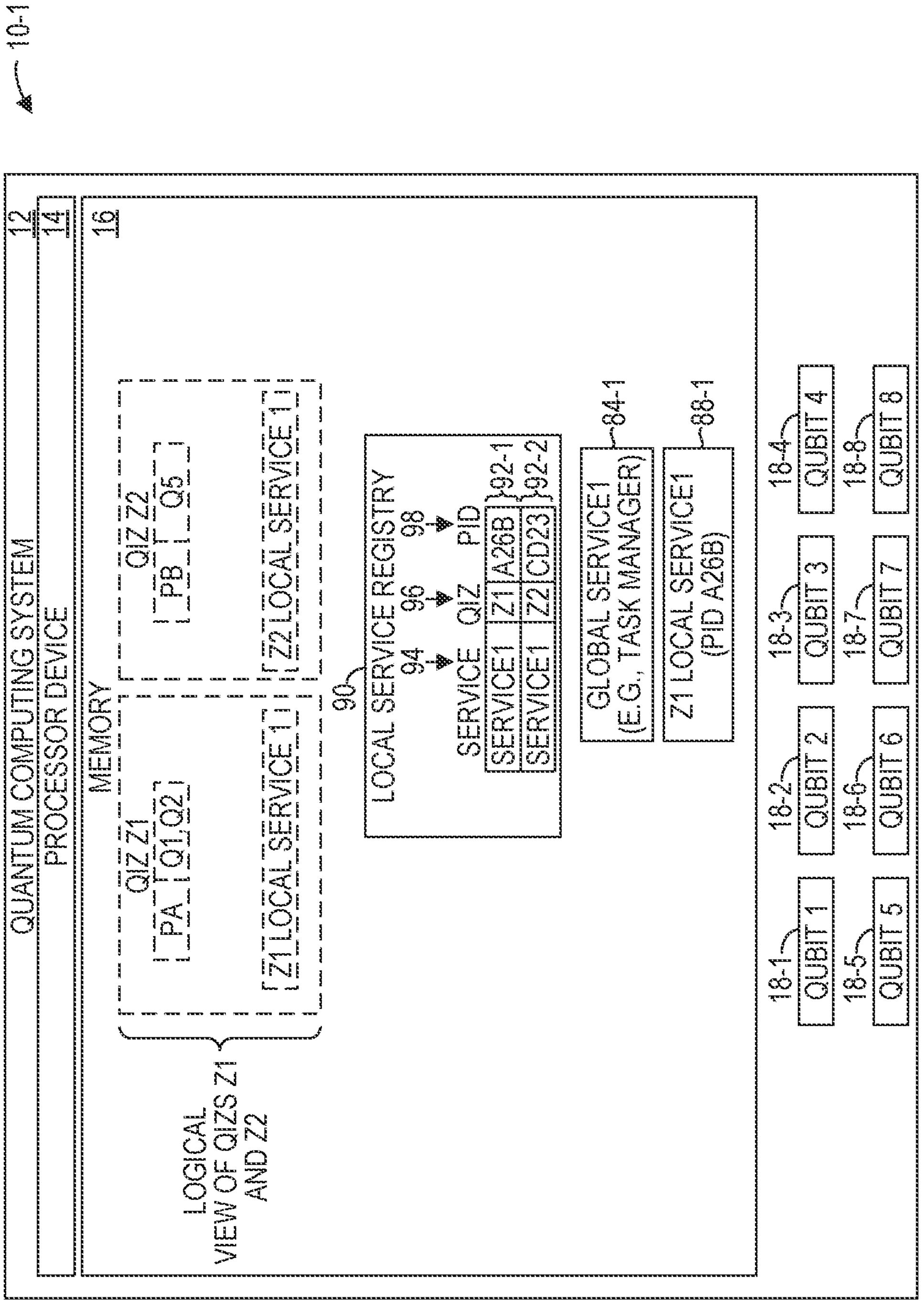
FIG. 10 is a simplified block diagram of the environment illustrated in FIG. 3 according to one implementation.

FIG. 10 is a simplified block diagram of the environment 10-1 illustrated in FIG. 3 according to one implementation. The environment 10-1 includes the quantum computing system 12 that includes the memory 16 and the processor device 14 coupled to the memory 16. The processor device 14 is to make a determination to initiate, for the QIZ Z1 of the plurality of different QIZs Z1 and Z2, a local service instance of the global service instance 84-1 that is executing on the quantum computing system 12, the QIZ Z1 having the set of qubits 18-1-18-4 associated therewith. The processor device 14 is further to cause the local service instance 88-1 to be initiated. The processor device 14 is further to modify the local service data structure, such as the local service registry 90, to indicate that the local service instance 88-1 is associated with the QIZ Z1.

Figure 11A:
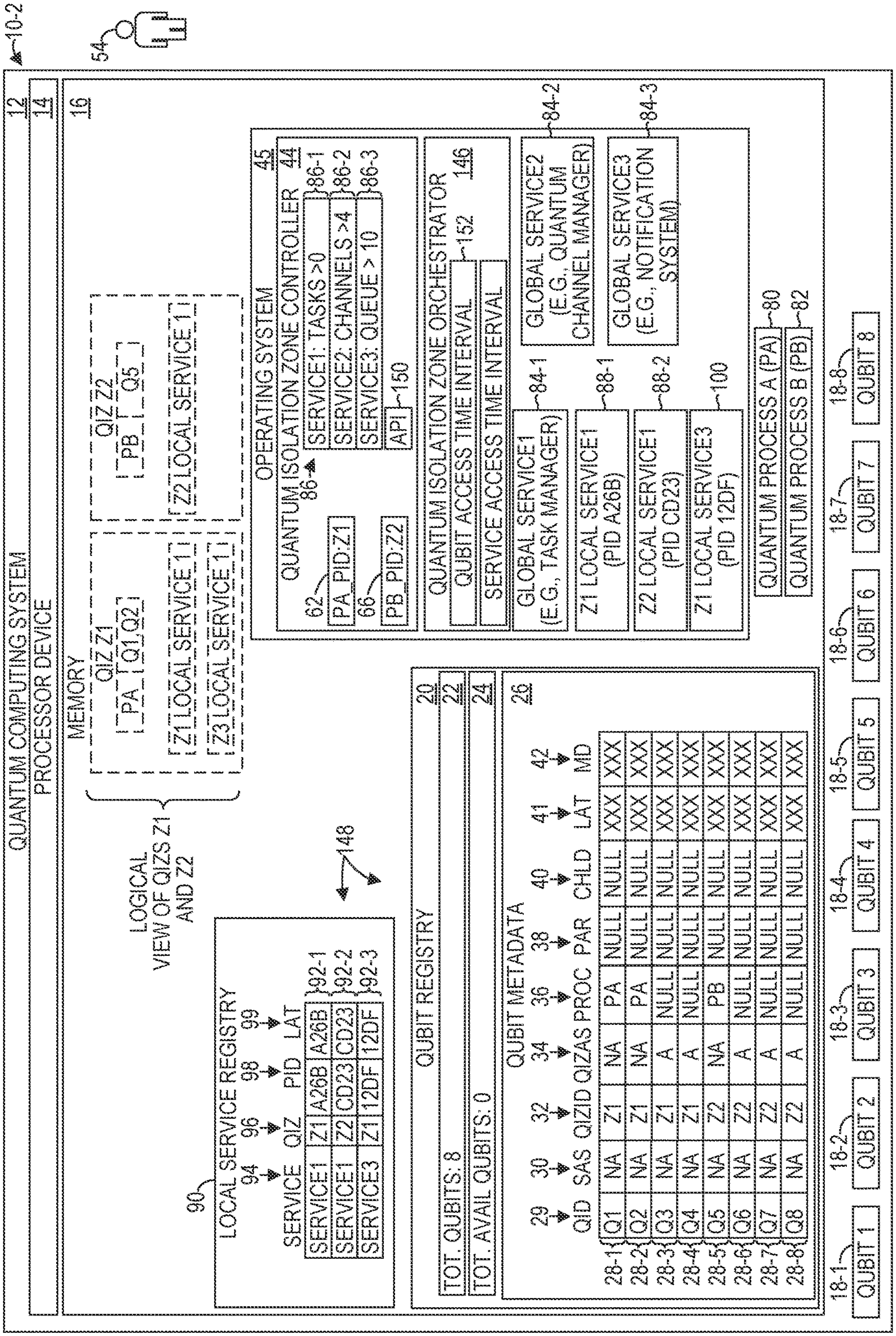
FIGS. 11A-11B are block diagrams of an environment suitable for QIZ orchestration according to another implementation.

FIG. 11A is a block diagram of an environment 10-2 according to another implementation. The environment 10-2 is substantially similar to the environments 10 and 10-1 except as otherwise noted herein. In this example, the quantum computing system 12 includes a QIZ orchestrator 146 that is configured to monitor QIZs of the quantum computing system 12 for resources that may be unused or underutilized. While the QIZ orchestrator 146 is illustrated as executing on the quantum computing system 12, in other implementations the quantum computing system 12 may execute on a classical computing system. Moreover, while in this example the QIZ orchestrator 146 is illustrated as being a separate component from the QIZ controller 44, in other implementations the QIZ orchestrator 146 may be a component of the QIZ controller 44.

The local service registry 90 and qubit registry 20 will be collectively referred to herein as QIZ metadata 148. In this example, each entry 92 of the local service registry 90 includes a last access time (LAT) 99 that identifies a last time that the corresponding local service was invoked. The last access time 99 may comprise, for example, a timestamp of the last time that the corresponding service was invoked. This information may be maintained, for example, by the local service itself, or by the operating system 45 for example. Each metadata record 28 of the qubit metadata 26 includes a last access time 41 that identifies a last time that the corresponding qubit 18 was accessed. The last access time 41 may comprise, for example, a timestamp of the last time that the corresponding qubit 18 was accessed.

The QIZ orchestrator 146 intermittently, periodically, in response to an event, or pursuant to a schedule, obtains the QIZ metadata 148. In some implementations, the QIZ orchestrator 146 may obtain the QIZ metadata 148 via communications with the QIZ controller 44 via an API 150. The QIZ orchestrator 146 may examine the LAT 41 of each qubit 18 that is allocated to a QIZ implemented on the quantum computing system 12. The QIZ orchestrator 146 may determine an interval of time between a current time and a last access time and compare the interval of time to a determined qubit access time interval 152. The qubit access time interval 152 may be any desirable interval of time, such as one minute, five minutes, thirty minutes, or the like. If the qubit 18 has not been accessed for a period of time greater than the qubit access time interval 152, the QIZ orchestrator 146 determines that the corresponding qubit 18 is to be deallocated from the corresponding QIZ and made available to the quantum computing system 12 for use outside of a QIZ or for subsequent allocation to a QIZ.

As an example, assume that the QIZ orchestrator 146 determines that the interval between the current time and the last access time 41 of the metadata record 28-5 is greater than the qubit access time interval 152. The metadata record 28-5 corresponds to the qubit 18-5 which has been allocated to the QIZ Z2.

Figure 11B:
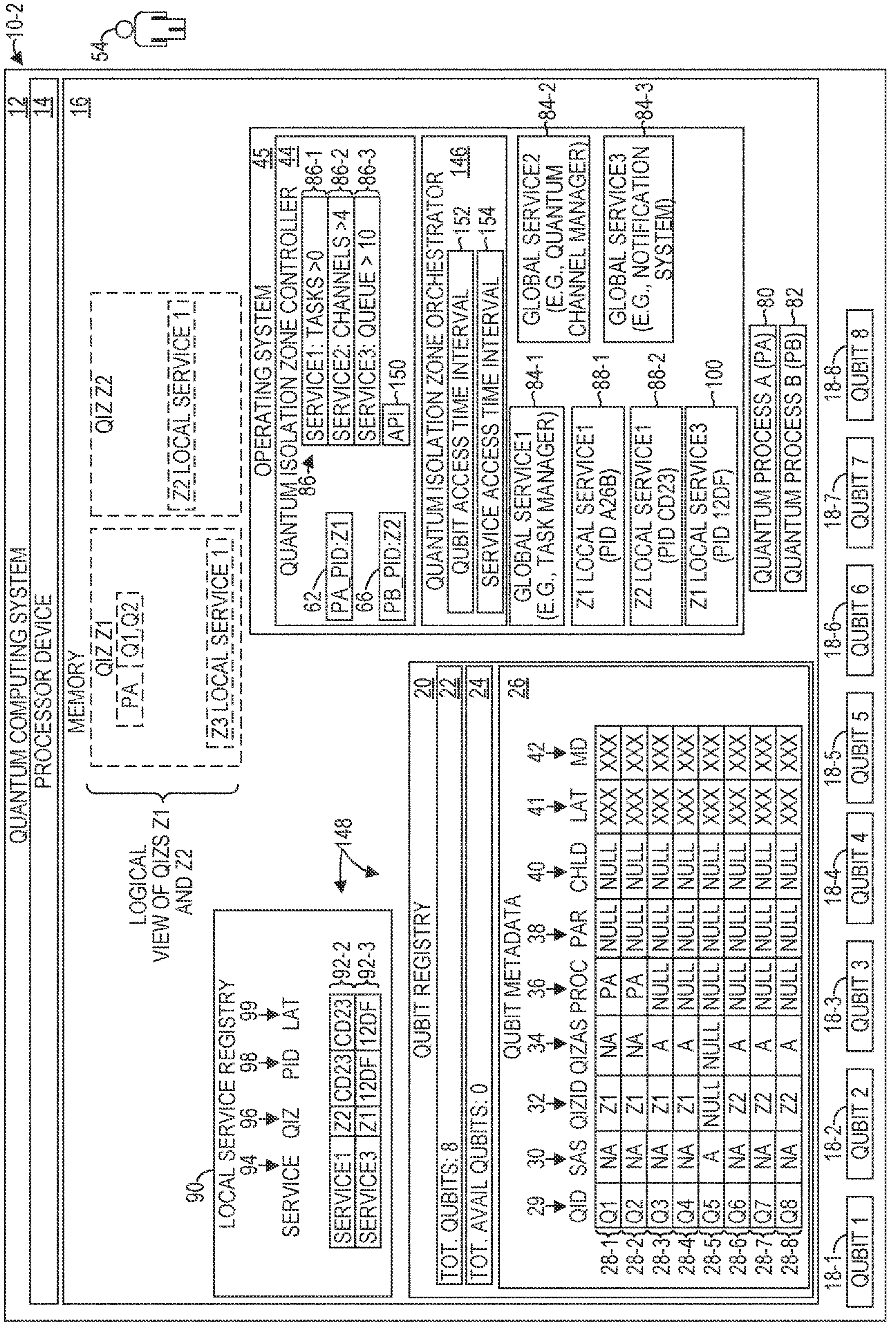

Referring now to FIG. 11B, the QIZ orchestrator 146 causes the deallocation of the qubit 18-5 to disassociate the qubit 18-5 from the QIZ Z2. The QIZ orchestrator 146 may cause the deallocation of the qubit 18-5 by modifying the qubit metadata 26 directly, or by invoking the API 150 to instruct the QIZ controller 44 to deallocate the qubit 18-5. In this example, the QIZ orchestrator 146 instructs the QIZ controller 44 to deallocate the qubit 18-5. The QIZ controller 44 modifies the metadata record 28-5 to indicate that the qubit 18-5 is no longer associated with the QIZ Z2 and is now available for allocation to another QIZ or to a quantum process executing outside of a QIZ. The QIZ controller 44 may send a message to the quantum process 82 informing the quantum process 82 that the qubit 18-5 is no longer available to the quantum process 82. A subsequent attempt by the quantum process 82 to access the qubit 18-5 would result in an error condition. In some examples, the QIZ controller 44 may determine that if the qubit 18-5 is being deallocated, this is an indication that the quantum process 82 is no longer performing any processing, and may instruct the quantum process 82 to terminate, or may cause the termination of the quantum process 82. While this example illustrates the deallocation of a single qubit 18, it should be apparent that the QIZ orchestrator 146 may determine that a number of qubits 18 should be deallocated, and cause the deallocation of such qubits 18 in a similar manner.

As another example, assume that the QIZ orchestrator 146 determines, based on the last access time 99 of the entry 92-1, that the local service 88-1 has not been utilized by a process associated with the QIZ Z1 for a period of time greater than a determined service access time interval 154. The service access time interval 154 may be any desirable interval of time, such as one minute, five minutes, thirty minutes, or the like. If the local service 88-1 has not been utilized for a period of time greater than the service access time interval 154, the QIZ orchestrator 146 determines that the local service 88-1 should be deallocated from the QIZ Z1 to free up memory resources and processor device resources that may be utilized by the local service 88-1.

The QIZ orchestrator 146 causes the termination of the local service 88-1. The QIZ orchestrator 146 may cause the termination of the local service 88-1 by, for example, invoking the API 150 to instruct the QIZ controller 44 to terminate the local service 88-1. The QIZ controller 44 modifies the local service registry 90 by deleting the entry 92-1, and sends a message to the local service 88-1 that causes the local service 88-1 to terminate.

It is noted that, because the QIZ orchestrator 146 is a component of the quantum computing system 12, functionality implemented by the QIZ orchestrator 146 may be attributed to the quantum computing system 12 generally. Moreover, in examples where the QIZ orchestrator 146 comprises software instructions that program the processor device 14 to carry out functionality discussed herein, functionality implemented by the QIZ orchestrator 146 may be attributed herein to the processor device 14.

Figure 12:
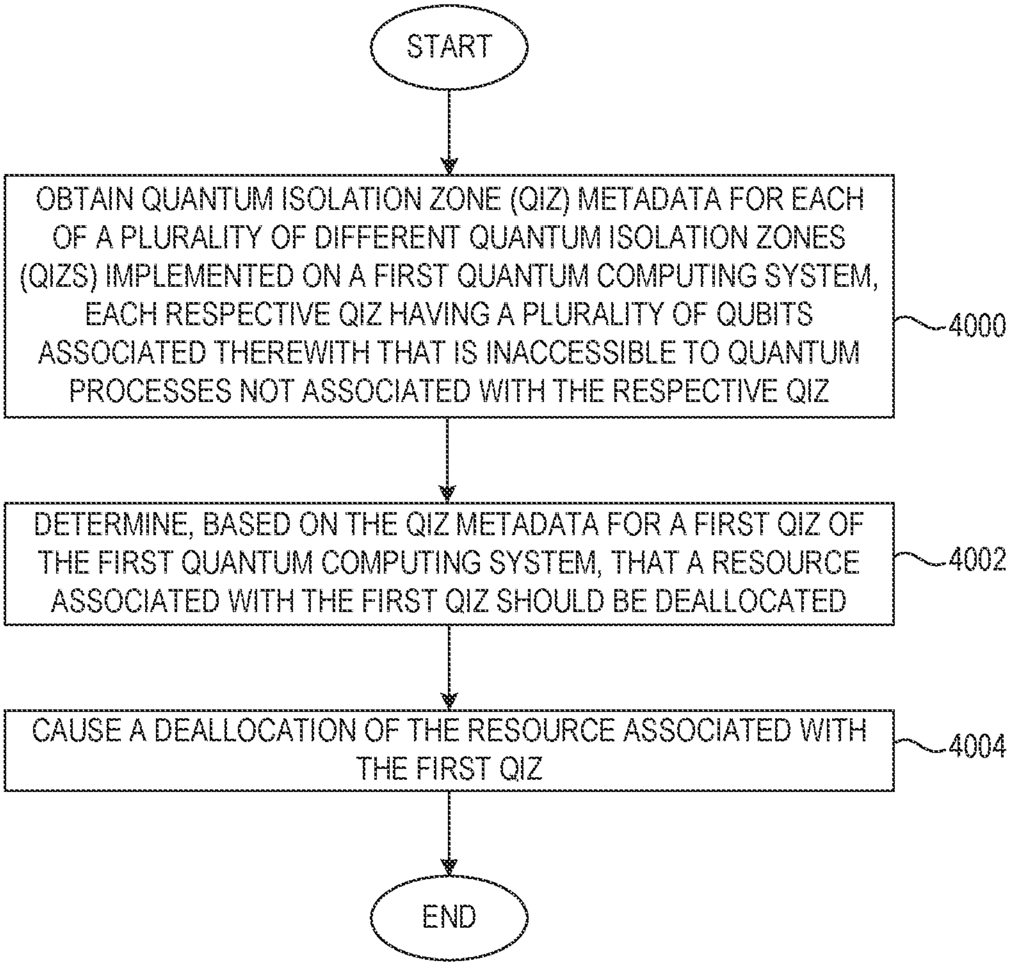
FIG. 12 is a flowchart of a method for QIZ orchestration according to one implementation.

FIG. 12 is a flowchart of a method for QIZ orchestration according to one implementation. FIG. 12 will be discussed in conjunction with FIGS. 11A-11B. The QIZ orchestrator 146 obtains the QIZ metadata 148 for each of the plurality of different QIZs Z1, Z2 implemented on the quantum computing system 12, each respective QIZ Z1, Z2 having a plurality of qubits 18 associated therewith that is inaccessible to quantum processes not associated with the respective QIZ Z1, Z2 (FIG. 12, block 4000). The QIZ orchestrator 146 determines, based on the QIZ metadata 148 for the QIZ Z2 of the quantum computing system 12, that a resource associated with the QIZ Z2, such as the qubit 18-5, should be deallocated (FIG. 12, block 4002). The QIZ orchestrator 146 causes a deallocation of the qubit 18-5 associated with the QIZ Z1 (FIG. 12, block 4004).

Figure 13:
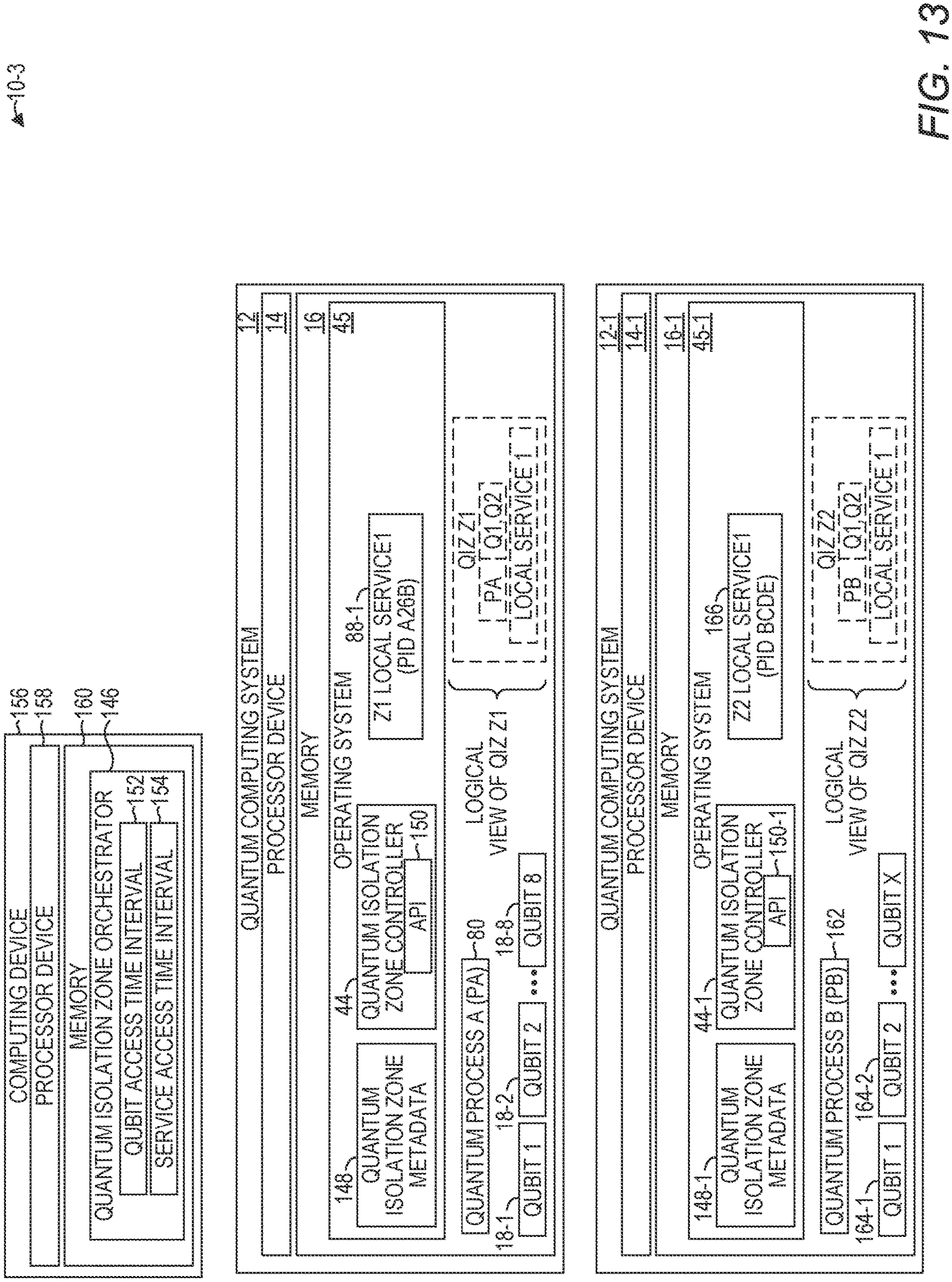
FIG. 13 is a block diagram of an environment suitable for QIZ orchestration according to another implementation.

FIG. 13 is a block diagram of an environment 10-3 according to another implementation. In this example, the QIZ orchestrator 146 executes on a classical computing device 156 that includes a processor device 158 and a memory 160. The QIZ orchestrator 146 monitors a plurality of quantum computing systems 12, 12-1 in a manner similar to that discussed above with regard to the quantum computing system 12. The quantum computing system 12-1 includes a processor device 14-1, a memory 16-1, an operating system 45-1, QIZ metadata 148-1, and a QIZ controller 44-1, each of which operates substantially similarly to the processor device 14, the memory 16, the operating system 45, the QIZ metadata 148, and the QIZ controller 44, respectively, of the quantum computing system 12, except as otherwise described herein.

The QIZ controller 44-1 has implemented a QIZ Z2 on the quantum computing system 12-1, with which a quantum process 162 is associated. Two qubits 164-1, 164-2 are associated with the QIZ Z2. A local service 166 is also associated with the QIZ Z2.

The QIZ orchestrator 146 intermittently, periodically, in response to an event, or pursuant to a schedule, obtains the QIZ metadata 148 from the quantum computing system 12 and obtains the QIZ metadata 148-1 from the quantum computing system 12-1 via APIs 150 and 150-1, respectively. The QIZ orchestrator 146 accesses the last access times 99 of the local service 88-1 associated with the QIZ Z1 of the quantum computing system 12, and of the local service 166 associated with the QIZ Z2 of the quantum computing system 12-1. The QIZ orchestrator 146 determines, based on the last access times 99 and the service access time interval 154 that the local service 88-1 and the local service 166 have been recently utilized and should not be deallocated. The QIZ orchestrator 146 accesses the last access times 41 of the qubits 18-1 and 18-2 of the quantum computing system 12. The QIZ orchestrator 146 determines, based on the last access times 41 and the qubit access time interval 152 that the qubits 18-1 and 18-2 have been recently utilized and should not be deallocated. Similarly, the QIZ orchestrator 146 accesses the last access times 41 of the qubits 164-1 and 164-2 of the quantum computing system 12-1. The QIZ orchestrator 146 determines, based on the last access times 41 and the qubit access time interval 152 that the qubits 164-1 and 164-2 have not been recently utilized and should be deallocated. The QIZ orchestrator 146 causes the deallocation of the qubits 164-1 and 164-2 to disassociate the qubits 164-1 and 164-2 from the QIZ Z2 of the quantum computing system 12-1. In this example, the QIZ orchestrator 146 invokes the API 150-1 to instruct the QIZ controller 44-1 to deallocate the qubits 164-1 and 164-2. The QIZ controller 44-1 modifies the corresponding metadata records of the QIZ metadata 148-1 to indicate that the qubits 164-1 and 164-2 are no longer associated with the QIZ Z2 and are now available for allocation to another QIZ of the quantum computing system 12-1, or to a quantum process executing outside of a QIZ on the quantum computing system 12-1. The QIZ controller 44-1 may send a message to the quantum process 162 informing the quantum process 162 that the qubits 164-1 and 164-2 are no longer available to the quantum process 162. A subsequent attempt by the quantum process 162 to access the qubits 164-1 and 164-2 would result in an error condition. In some examples, the QIZ controller 44-1 may determine that if the qubits 164-1 and 164-2 are being deallocated, this is an indication that the quantum process 162 is no longer performing any processing, and may instruct the quantum process 162 to terminate, or may cause the termination of the quantum process 162.

In another implementation, the QIZ orchestrator 146 determines that an interaction is to be facilitated between two QIZs. In a first example, the QIZ orchestrator 146 determines that an entanglement interaction is to be facilitated between the QIZ Z1 of the quantum computing system 12 and the QIZ Z2 of the quantum computing system 12-1. This determination may be made, for example, via the receipt of a message from an operator.

The QIZ orchestrator 146 sends, to the QIZ controller 44, a message that an entanglement request is incoming for a quantum process F that will be deployed in QIZ Z1. The QIZ orchestrator 146 provides a QASM file that defines the functionality of the quantum process F to the QIZ controller 44. In this example, the QASM file requires seven qubits 18 on the quantum computing system 12 and five qubits on the quantum computing system 12-1. The QIZ orchestrator 146 provides an address of the QIZ controller 44-1 to the QIZ controller 44 so that the QIZ controller 44 can communicate with the QIZ controller 44-1. The QIZ controller 44 modifies the QIZ metadata 148 to allocate the seven qubits 18 to the QIZ Z1. The QIZ controller 44 generates a PID for the service to be initiated. The QIZ controller 44 sends a handshake request to the QIZ controller 44-1. The QIZ controller 44 shares the request for five qubits 164 implemented by the quantum computing system 12-1 that will be required by the quantum process F, and includes the PID of the quantum process F to the QIZ controller 44-1. The QIZ controller 44-1 creates a dummy process for the quantum process F in the QIZ Z2 that has the same PID and allocates the five qubits 164 to that process in the QIZ Z2. The QIZ controller 44-1 sends an addressable list of the five qubits 164 to the QIZ controller 44 that includes a networking route of system/controller/qubit address, such that a network call to those qubits 164 can be made. The QIZ controller 44 modifies the QASM file of the quantum process F, inserting the qubit addresses of the five qubits 164 provided by the QIZ controller 44 and the qubit addresses of the seven qubits 18. The QIZ controller 44 instantiates the quantum process F in the QIZ Z1 and sends a message to the QIZ controller 44-1 indicating that the quantum process F has been initiated.

As another example, the QIZ orchestrator 146 sends a request to the QIZ controller 44 that a discoverable networking route for QIZ Z1 is to be created with the quantum computing system 12-1. The QIZ orchestrator 146 provides an address of the QIZ controller 44-1 to the QIZ controller 44. The QIZ controller 44 sends a handshake request to the QIZ controller 44-1. The QIZ controller 44 instantiates a network service within QIZ Z1. The QIZ controller 44-1 instantiates a network service within QIZ Z2. The QIZ controller 44 and the QIZ controller 44-1 exchange network service credentials allowing each network service to discover and authenticate to the other. The QIZ controller 44 makes the network service of the QIZ Z1 discoverable, and the QIZ controller 44-1 makes the network service of the QIZ Z2 discoverable such that quantum processes associated with the QIZ Z1 can discover services in the QIZ Z2, and vice versa.

Figure 14:
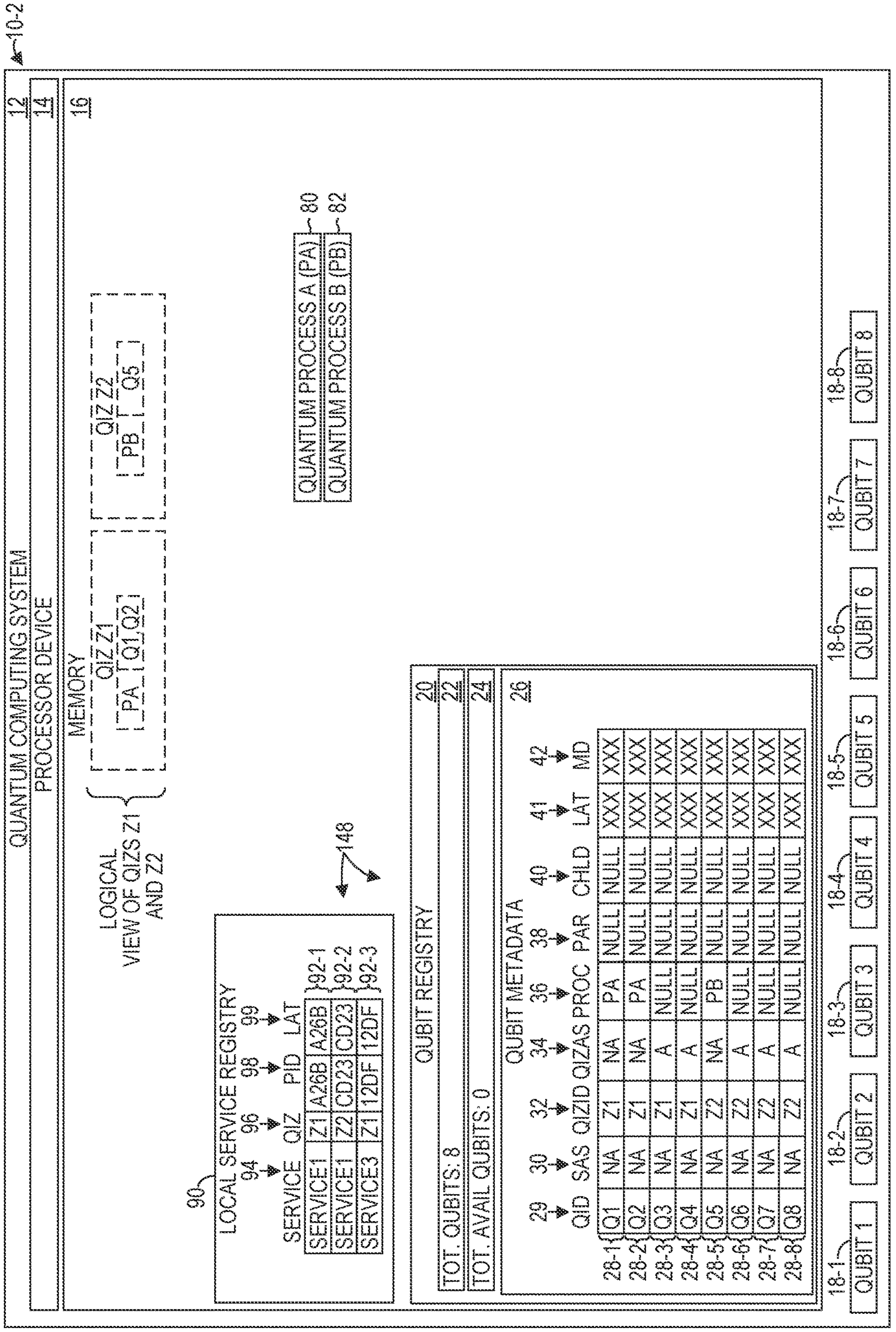
FIG. 14 is a simplified block diagram of the environment illustrated in FIGS. 11A-11B according to one implementation.

FIG. 14 is a simplified block diagram of the environment 10-2 illustrated in FIGS. 11A-11B according to one implementation. The environment 10-2 includes the quantum computing system 12, which in turn includes the memory 16 and the processor device 14 coupled to the memory 16. The processor device 14 is to obtain the QIZ metadata 148 for each of the plurality of different QIZs Z1, Z2 implemented on the quantum computing system 12, each respective QIZ Z1, Z2 having a plurality of qubits 18 associated therewith that is inaccessible to quantum processes not associated with the respective QIZ Z1, Z2. The processor device 14 is further to determine, based on the QIZ metadata 148 for the QIZ Z2 of the quantum computing system 12, that a resource, such as the qubit 18-5, associated with the QIZ Z2 should be deallocated. The processor device 14 is further to cause a deallocation of the qubit 18-5 associated with the QIZ Z2.

Figure 15:
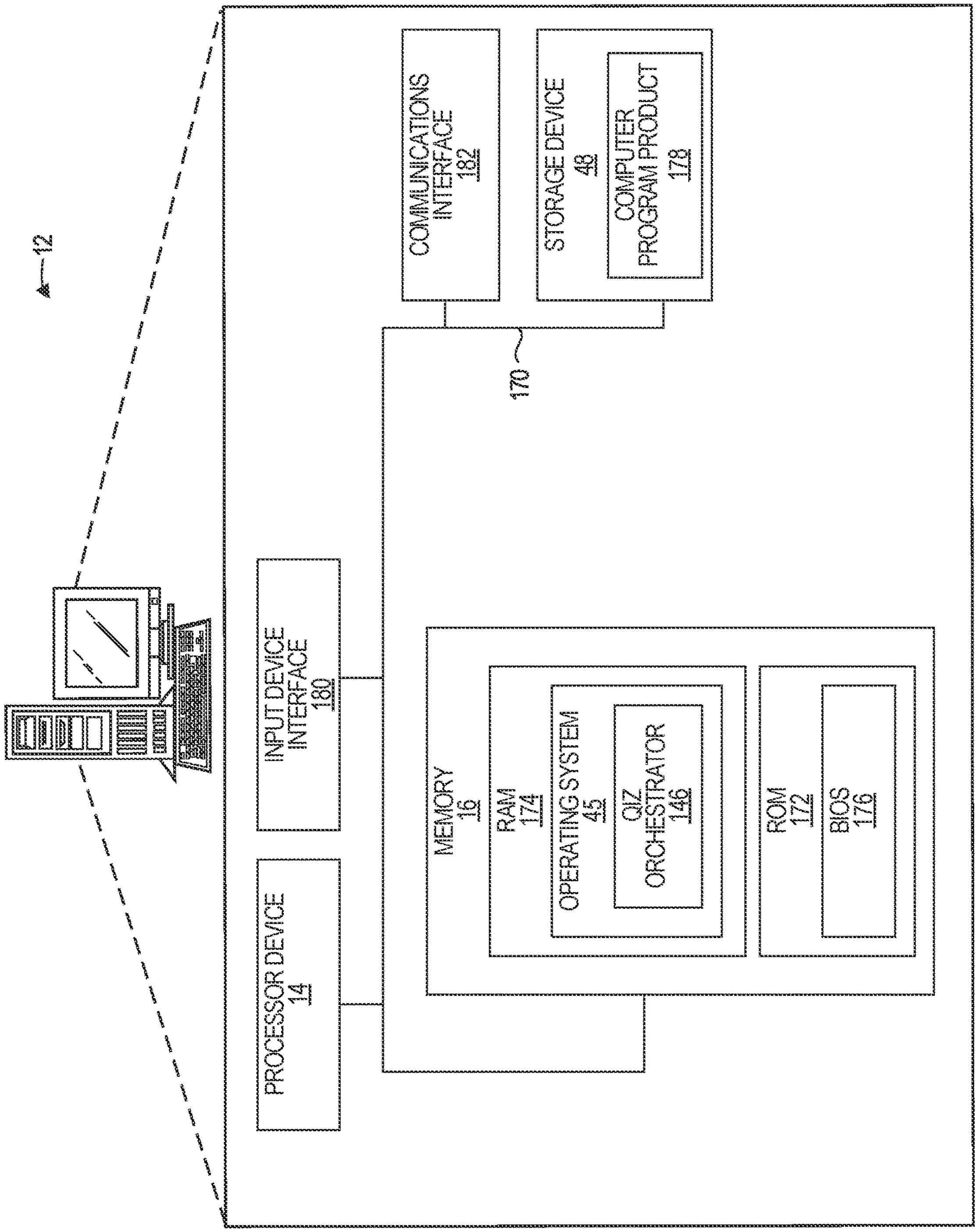
FIG. 15 is a block diagram of a computing device suitable for implementing examples disclosed herein.

FIG. 15 is a block diagram of the quantum computing system 12 suitable for implementing examples according to one example. The quantum computing system 12 may comprise any computing or electronic device capable of including firmware, hardware, and/or executing software instructions to implement the functionality described herein. The quantum computing system 12 includes the processor device 14, the system memory 16, and a system bus 170. The system bus 170 provides an interface for system components including, but not limited to, the system memory 16 and the processor device 14. The processor device 14 can be any commercially available or proprietary processor device.

The system bus 170 may be any of several types of bus structures that may further interconnect to a memory bus (with or without a memory controller), a peripheral bus, and/or a local bus using any of a variety of commercially available bus architectures. The system memory 16 may include non-volatile memory 172 (e.g., read-only memory (ROM), erasable programmable read-only memory (EPROM), electrically erasable programmable read-only memory (EEPROM), etc.), and volatile memory 174 (e.g., random-access memory (RAM)). A basic input/output system (BIOS) 176 may be stored in the non-volatile memory 172 and can include the basic routines that help to transfer information between elements within the quantum computing system 12. The volatile memory 174 may also include a high-speed RAM, such as static RAM, for caching data.

The quantum computing system 12 may further include or be coupled to a non-transitory computer-readable storage medium such as the storage device 48, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 48 and other drives associated with computer-readable media and computer-usable media may provide non-volatile storage of data, data structures, computer-executable instructions, and the like.

A number of modules can be stored in the storage device 48 and in the volatile memory 174, including the operating system 45 which includes the QIZ orchestrator 146, which may implement the functionality described herein in whole or in part. All or a portion of the examples may be implemented as a computer program product 178 stored on a transitory or non-transitory computer-usable or computer-readable storage medium, such as the storage device 48, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14.

The operator 54 may also be able to enter one or more configuration commands through a keyboard (not illustrated), a pointing device such as a mouse (not illustrated), or a touch-sensitive surface such as a display device. Such input devices may be connected to the processor device 14 through an input device interface 180 that is coupled to the system bus 170 but can be connected by other interfaces such as a parallel port, an Institute of Electrical and Electronic Engineers (IEEE) 1394 serial port, a Universal Serial Bus (USB) port, an IR interface, and the like. The quantum computing system 12 may also include a communications interface 182 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:

obtaining, by a computing device comprising a processor device, a request via a quantum isolation zone (QIZ) allocation user interface (UI) to allocate a first plurality of qubits from available qubits on a first quantum computing system to establish a first QIZ of a plurality of different QIZs implemented on the first quantum computing system;

obtaining, by the computing device, QIZ metadata for each of the plurality of different QIZs implemented on the first quantum computing system, the QIZ metadata for each respective QIZ of the plurality of different QIZs indicative of a respective plurality of qubits associated therewith that is inaccessible to quantum processes not associated with the respective QIZ, wherein requests by quantum processes associated with the respective QIZ are routed based on the QIZ metadata to the respective QIZ;

receiving, by a QIZ controller implemented by the processor device, a request to initiate a first quantum process into the first QIZ;

mapping, by the QIZ controller, a unique program identifier (PID) of the first quantum process to a QIZ identifier (QIZID) of the first QIZ in the QIZ metadata;

allocating, by the QIZ controller, one or more qubits of the first plurality of qubits associated with the first QIZ to the first quantum process; and executing, by accessing the allocated one or more qubits, the first quantum process within the first QIZ, wherein the first quantum process is isolated from at least one second quantum process provided in the plurality of different QIZs other than the first QIZ, and wherein the respective plurality of qubits associated with the plurality of different QIZs other than the first QIZ are not accessed by the first quantum process during execution.

2. The method of claim 1, further comprising:
determining, based on the QIZ metadata for the first QIZ of the first quantum computing system, that a resource associated with the first QIZ should be deallocated; and
causing a deallocation of the resource associated with the first QIZ, wherein causing the deallocation of the resource associated with the first QIZ comprises causing the resource associated with the first QIZ to terminate.

3. The method of claim 2, wherein the QIZ metadata identifies a time of last access for each qubit of the first plurality of qubits associated with the first QIZ.

4. The method of claim 3, wherein the resource associated with the first QIZ comprises a qubit of the first plurality of qubits associated with the first QIZ, and wherein determining, based on the QIZ metadata for the first QIZ, that the resource associated with the first QIZ should be deallocated comprises determining, based on the QIZ metadata for the first QIZ, that the qubit of the first plurality of qubits has not been accessed for a period of time greater than a determined qubit access time interval.

5. The method of claim 4, wherein the deallocation of the resource associated with the first QIZ further comprises modifying the QIZ metadata to disassociate the qubit of the first plurality of qubits from the first QIZ and make the qubit of the first plurality of qubits available for subsequent allocation to any QIZ of the plurality of different QIZs.

6. The method of claim 1, further comprising:
determining that an interaction is to be facilitated between the first QIZ on the first quantum computing system and a second QIZ implemented on a second quantum computing system; and
sending, to the QIZ controller executing on the first quantum computing system, address information of a second QIZ controller implemented by a second processor device executing on the second quantum computing system, the QIZ controller configured to implement the plurality of QIZs on the first quantum computing system and the second QIZ controller configured to implement a plurality of QIZs on the second quantum computing system.

7. The method of claim 6, wherein the interaction comprises an entanglement of a first qubit in the first QIZ and a second qubit in the second QIZ.

8. The method of claim 6, wherein the interaction comprises an establishment of a network service between one or more quantum processes associated with the first QIZ on the first quantum computing system and one or more quantum processes associated with the second QIZ on the second quantum computing system.

9. The method of claim 1, further comprising:
receiving a request to initiate a local service instance of a global service instance executing on the first quantum computing system;
modifying the QIZ metadata to indicate that the local service instance is associated with the first QIZ; and
based on the QIZ metadata, routing a subsequent request for a service implemented by the global service instance to the local service instance.

10. The method of claim 1, wherein allocating the one or more qubits of the first Plurality of qubits to the first quantum process comprises modifying a QIZ availability status of the QIZ metadata for the one or more qubits to indicate that the one or more qubits are not available for allocation within the first QIZ.

11. A computing system comprising:
a memory; and
a processor device coupled to the memory to:
obtain a request via a quantum isolation zone (QIZ) allocation user interface (UI) to allocate a first plurality of qubits from available qubits on a first quantum computing system to establish a first QIZ of a plurality of different QIZs implemented on the first quantum computing system;
obtain QIZ metadata for each of the plurality of different QIZs implemented on the first quantum computing system, each respective QIZ having a respective plurality of qubits associated therewith that is inaccessible to quantum processes not associated with the respective QIZ, wherein requests by quantum processes associated with the respective QIZ are routed based on the QIZ metadata to the respective QIZ;
receive, by a QIZ controller implemented by the processor device, a request to initiate a first quantum process into the first QIZ;
map, by the QIZ controller, a unique program identifier (PID) of the first quantum process to a QIZ identifier (QIZID) of the first QIZ in the QIZ metadata;
allocate, by the QIZ controller, one or more qubits of the first plurality of qubits associated with the first QIZ to the first quantum process; and
execute, by accessing the allocated one or more qubits, the first quantum process within the first QIZ, wherein the first quantum process is isolated from at least one second quantum process provided in the plurality of different QIZs other than the first QIZ, and wherein the respective plurality of qubits associated with the plurality of different QIZs other than the first QIZ are not accessed by the first quantum process during execution.

12. The computing system of claim 11, wherein the processor device is further to:
determine, based on the QIZ metadata for the first QIZ of the first quantum computing system, that a resource associated with the first QIZ should be deallocated; and
cause a deallocation of the resource associated with the first QIZ, wherein causing the deallocation of the resource associated with the first QIZ comprises causing the resource associated with the first QIZ to terminate.

13. The computing system of claim 12, wherein the QIZ metadata identifies a time of last access for each qubit of the first plurality of qubits associated with the first QIZ.

14. The computing system of claim 13, wherein the resource associated with the first QIZ comprises a qubit of the first plurality of qubits associated with the first QIZ, and wherein to determine, based on the QIZ metadata for the first QIZ, that the resource associated with the first QIZ should be deallocated, the processor device is further to determine, based on the QIZ metadata for the first QIZ, that the qubit of the first plurality of qubits has not been accessed for a period of time greater than a determined qubit access time interval.

15. The computing system of claim 13, wherein the resource associated with the first QIZ comprises a first local service that is associated with the first QIZ, and wherein the QIZ metadata identifies a last time of access of the first local service that identifies a time at which the first local service was last utilized by a process associated with the first QIZ.

16. A non-transitory computer-readable storage medium that includes executable instructions to cause a processor device on a first quantum computing system to:

obtain a request via a quantum isolation zone (QIZ) allocation user interface (UI) to allocate a first plurality of qubits from available qubits on the first quantum computing system to establish a first QIZ of a plurality of different QIZs implemented on the first quantum computing system;

obtain QIZ metadata for each of the plurality of different QIZs implemented on the first quantum computing system, the QIZ metadata indicating that a quantum process is associated with the first QIZ, each respective QIZ having a respective plurality of qubits associated therewith that is inaccessible to quantum processes not associated with the respective QIZ, wherein requests by quantum processes associated with the respective QIZ are routed based on the QIZ metadata to the respective QIZ;

receive, by a QIZ controller implemented by the processor device, a request to initiate a first quantum process into the first QIZ;

map, by the QIZ controller, a unique program identifier (PID) of the first quantum process to a QIZ identifier (QIZID) of the first QIZ in the QIZ metadata;

allocate, by the QIZ controller, one or more qubits of the first plurality of qubits associated with the first QIZ to the first quantum process; and execute, by accessing the allocated one or more qubits, the first quantum process within the first QIZ, wherein the first quantum process is isolated from at least one second quantum process provided in the plurality of different QIZs other than the first QIZ, and wherein the respective plurality of qubits associated with the plurality of different QIZs other than the first QIZ are not accessed by the first quantum process during execution.

17. The non-transitory computer-readable storage medium of claim 16, wherein the executable instructions are further to cause the processor device on the first quantum computing system to:

determine, based on the QIZ metadata for the first QIZ of the first quantum computing system, that a resource associated with the first QIZ should be deallocated, wherein the resource associated with the first QIZ comprises a first local service that is associated with the first QIZ, and wherein the QIZ metadata identifies a last time of access of the first local service that identifies a time at which the first local service was last utilized by the first quantum process associated with the first QIZ; and cause a deallocation of the resource associated with the first QIZ, wherein causing the deallocation of the resource associated with the first QIZ comprises causing the first local service to terminate.

18. The non-transitory computer-readable storage medium of claim 17, wherein the QIZ metadata further identifies a time of last access for each qubit of the first plurality of qubits associated with the first QIZ.

19. The non-transitory computer-readable storage medium of claim 18, wherein the resource associated with the first QIZ comprises a qubit of the first plurality of qubits associated with the first QIZ and utilized by the first local service, and wherein to determine, based on the QIZ metadata for the first QIZ, that the resource associated with the first QIZ should be deallocated, the executable instructions further cause the processor device to determine, based on the QIZ metadata for the first QIZ, that the qubit of the first plurality of qubits has not been accessed for a period of time greater than a determined qubit access time interval.

20. The non-transitory computer-readable storage medium of claim 18, wherein the resource associated with the first QIZ comprises the first local service that is associated with the first QIZ, and wherein the QIZ metadata further identifies a last time of access of the first local service that identifies a time at which the first local service was last utilized by a process associated with the first QIZ.

* * * * *